United States Patent
Jin et al.

(10) Patent No.: US 12,445,753 B2
(45) Date of Patent: Oct. 14, 2025

(54) IMAGE SENSOR AND VEHICLE

(71) Applicant: SAMSUNG ELECTRONICS CO., LTD., Suwon-si (KR)

(72) Inventors: Young Gu Jin, Suwon-si (KR); Young Sun Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 18/098,237

(22) Filed: Jan. 18, 2023

(65) Prior Publication Data
US 2023/0328408 A1 Oct. 12, 2023

(30) Foreign Application Priority Data

Apr. 8, 2022 (KR) .................. 10-2022-0043957

(51) Int. Cl.
*H04N 25/79* (2023.01)
*H04N 25/11* (2023.01)
*H04N 25/702* (2023.01)
*H04N 25/77* (2023.01)
*H10F 39/00* (2025.01)
*H10F 39/18* (2025.01)

(52) U.S. Cl.
CPC ............ *H04N 25/79* (2023.01); *H04N 25/11* (2023.01); *H04N 25/702* (2023.01); *H04N 25/77* (2023.01); *H10F 39/8053* (2025.01); *H10F 39/182* (2025.01)

(58) Field of Classification Search
CPC ...... H04N 23/80; H04N 23/73; H04N 23/741; H04N 23/665
See application file for complete search history.

(56) References Cited

U.S. PATENT DOCUMENTS

| 9,147,704 | B2 | 9/2015 | Li et al. |
| 10,091,481 | B2 | 10/2018 | Seger |
| 10,397,500 | B1 | 8/2019 | Xu et al. |

(Continued)

FOREIGN PATENT DOCUMENTS

WO    WO 2020/121724 A1    6/2020

OTHER PUBLICATIONS

European Office Action dated Aug. 9, 2023, of the corresponding EP Application No. 23166589.4.

(Continued)

*Primary Examiner* — Hung H Lam
(74) *Attorney, Agent, or Firm* — Muir Patent Law, PLLC

(57) ABSTRACT

An image sensor includes a pixel group including a first region and a second region; and a color filter having a first color on the pixel group, wherein the first region includes a first pixel including a first photodiode, a first floating diffusion region on the first photodiode, and a first transfer transistor on the first photodiode, the second region includes a second pixel including a second photodiode, a second floating diffusion region, and a second transfer transistor connected to the second photodiode and the second floating diffusion region, at least one of the first pixel and the second pixel is arranged in m*n (m and n are natural numbers of 2 or more), and from a planar point of view, a total area of the first photodiode included in the first region is greater than a total area of the second photodiode included in the second region.

19 Claims, 35 Drawing Sheets

(56) References Cited

U.S. PATENT DOCUMENTS

| | | |
|---|---|---|
| 10,666,881 B2 | 5/2020 | Kaneko et al. |
| 2008/0179490 A1 | 7/2008 | Ohno et al. |
| 2015/0130010 A1 | 5/2015 | Li et al. |
| 2019/0131333 A1* | 5/2019 | Borthakur ............ H10F 39/8027 |
| 2021/0327932 A1* | 10/2021 | Hsieh .................... H10F 39/182 |
| 2021/0344834 A1 | 11/2021 | Lee et al. |
| 2021/0358993 A1* | 11/2021 | Mao ...................... H04N 25/778 |
| 2022/0123033 A1* | 4/2022 | Park ........................ H04N 23/73 |
| 2023/0018370 A1* | 1/2023 | Asatsuma ........... H10F 39/8023 |
| 2023/0268360 A9* | 8/2023 | Zhang ................... H04N 25/57 |
| | | 348/294 |

OTHER PUBLICATIONS

European Search Report dated Jul. 28, 2023, of the corresponding EP Application No. 23166589.4.

* cited by examiner

PG1-21

PA-3

IMAGE SENSOR AND VEHICLE

CROSS-REFERENCE TO RELATED APPLICATION

This application claims priority to Korean Patent Application No. 10-2022-0043957, filed on Apr. 8, 2022, and all the benefits accruing therefrom under 35 U.S.C. § 119, the disclosure of which is incorporated herein by reference in its entirety.

BACKGROUND

1. Field

Embodiments relate to an image sensor and a vehicle.

2. Description of the Related Art

An image sensing device may be a semiconductor element that converts optical information into an electric signal. Examples of such an image sensing device may include a charge coupled device (CCD) image sensing device and a complementary metal-oxide semiconductor (CMOS) image sensing device.

The CMOS image sensor may be abbreviated as a CIS (CMOS image sensor). The CIS may include a plurality of pixels arranged two-dimensionally. Each of the pixels may include, e.g., a photodiode (PD). The photodiode may serve to convert incident light into electrical signals.

Recently, with development of the computer industry and the telecommunication industry, demands for image sensors with improved performance in various fields, such as a digital camera, a video camera, a smart phone, a game console, a security camera, a medical micro camera, a robot, and a vehicle have increased.

SUMMARY

An embodiment is directed to an image sensor including a pixel group including a first region and a second region; and a color filter having a first color on the pixel group, wherein the first region includes a first pixel including a first photodiode, a first floating diffusion region on the first photodiode, and a first transfer transistor on the first photodiode, the second region includes a second pixel including a second photodiode, a second floating diffusion region, and a second transfer transistor connected to the second photodiode and the second floating diffusion region, at least one of the first pixel and the second pixel is arranged in m*n (m and n are natural numbers of 2 or more), and from a planar point of view, a total area of the first photodiode included in the first region is greater than a total area of the second photodiode included in the second region.

An embodiment is directed to an image sensor including a first pixel including a first photodiode, a first transfer transistor connected between the first photodiode and a first floating diffusion region, and a connecting transistor, and a second pixel including a second photodiode, and a second transfer transistor connected between the second photodiode and the second floating diffusion region; and a color filter having a first color on the pixel group, wherein the number of at least one of the first pixel and the second pixel is a plurality.

An embodiment is directed to a vehicle including an electronic control unit; and an image sensor connected to the electronic control unit, wherein the image sensor includes a pixel array including a plurality of pixel groups, a color filter corresponding to each of the pixel groups on the pixel array, and a readout circuit that connects the pixel array and the electronic control unit, wherein each of the pixel groups includes at least one first pixel and at least one second pixel, at least one first pixel, the first pixel includes a first photodiode, a first floating diffusion region on the first photodiode, and a first transfer transistor on the first photodiode, at least one second pixel, the second pixel includes a second photodiode, a second floating diffusion region on the second photodiode, and a second transfer transistor on the second photodiode, from a planar point of view, a total area of the first photodiode each included in at least one first pixel is greater than a total area of the second photodiode each included in at least one second pixel, and at least one of at least one first pixel and at least one second pixel is arranged in m*n (m and n are natural numbers of 2 or more).

BRIEF DESCRIPTION OF THE DRAWINGS

Features will become apparent to those of skill in the art by describing in detail example embodiments with reference to the attached drawings in which.

DETAILED DESCRIPTION

Figure 1:
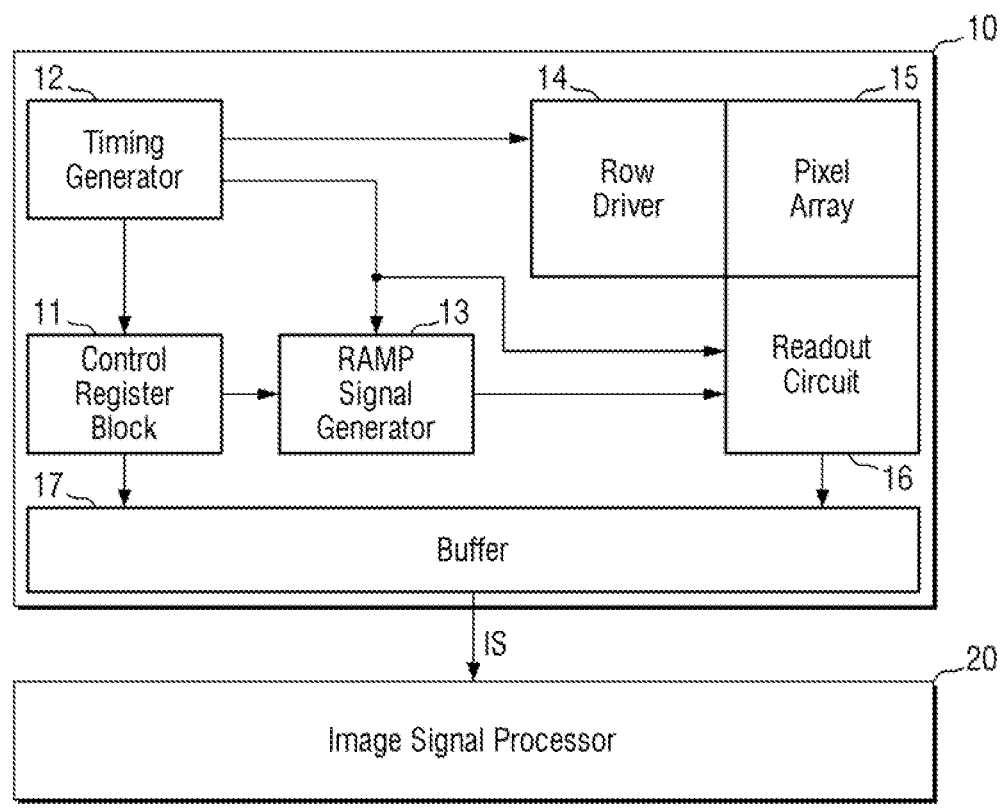
FIG. 1 is a block diagram for explaining an image sensing device according to some example embodiments.

FIG. 1 is a block diagram for explaining an image sensing device according to some example embodiments.

Referring to FIG. 1, an image sensing device 1 according to some example embodiments may include an image sensor 10 and an image signal processor 20.

The image sensor 10 may generate an image signal IS by sensing an image to be sensed using light. The generated image signal IS may be, e.g., a digital signal.

The image signal IS may be provided to the image signal processor 20 and processed therein. The image signal processor 20 may receive the image signal IS that is output from a buffer 17 of the image sensor 10, and may process or treat the received image signal IS to display the image signal The image signal processor 20 may perform digital binning on the image signal IS that is output from the image sensor 10. The image signal IS that is output from the image sensor 10 may be a raw image signal from the pixel array 15 without analog binning, and may also be the image signal IS on which the analog binning has already been performed.

The image sensor 10 and the image signal processor 20 may be disposed separately from each other, e.g., the image sensor 10 may be mounted on a first chip and the image signal processor 20 may be mounted on a second chip to communicate with each other through a predetermined interface. In another implementation, the image sensor 10 and the image signal processor 20 may be implemented as a single package, e.g., a multi-chip package (MCP).

The image sensor 10 may include a pixel array 15, a control register block 11, a timing generator 12, a row driver 14, a readout circuit 16, a ramp signal generator 13, and a buffer 17.

The control register block 11 may generally control the operation of the image sensor 10. For example, the control register block 11 may directly transmit an operating signal to the timing generator 12, the ramp signal generator 13, and the buffer 17.

The timing generator 12 may generate a signal that serves as a reference for the operating timing of various components of the image sensor 10. An operating timing reference signal generated by the timing generator 12 may be sent to the ramp signal generator 13, the row driver 14, the readout circuit 16, and the like.

The ramp signal generator 13 may generate and transmit the ramp signal that is used in the readout circuit 16. The readout circuit 16 may include a correlated double sampler (CDS), a comparator, or the like. The ramp signal generator 13 may generate and transmit the ramp signal that is used in the correlated double sampler (CDS), the comparator, or the like.

The row driver 14 may selectively activate the rows of the pixel array 15.

The pixel array 15 may sense an external image. The pixel array 15 may include a plurality of pixels.

The readout circuit 16 may sample the pixel signal provided from the pixel array 15, compare the pixel signal to the ramp signal, and then convert an analog image signal (data) into a digital image signal (data) on the basis of the comparison results.

The buffer 17 may include, e.g., a latch. The buffer 17 may temporarily store the image signal IS to be provided to the outside, and may transmit the image signal IS to an external memory or an external device.

Figure 2:
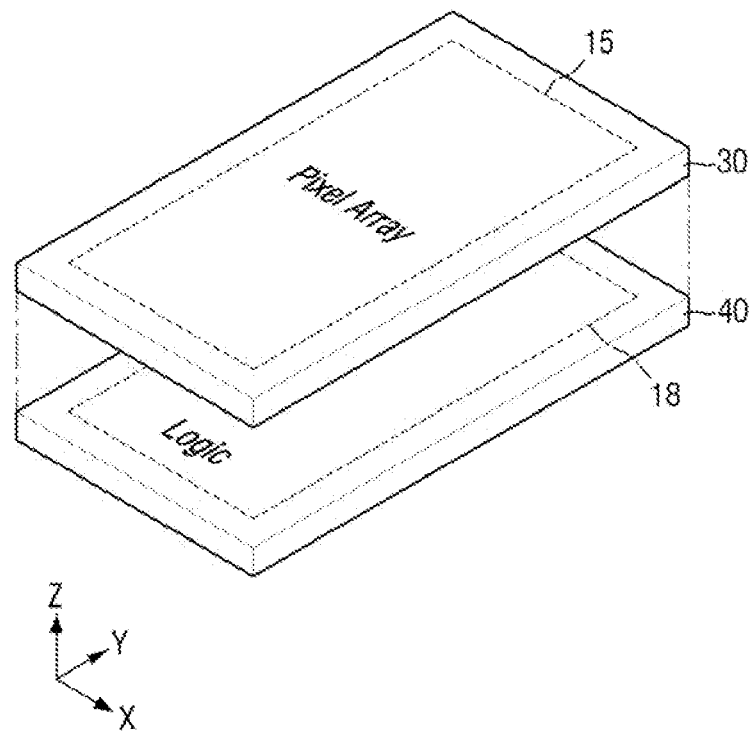
FIG. 2 is a diagram that shows a conceptual layout of an image sensor according to some example embodiments.

FIG. 2 is a diagram that shows a conceptual layout of the image sensor according to some example embodiments.

Referring to FIG. 2, an image sensor 10-1 according to some example embodiments may include a first layer 30 and a second layer 40 which are stacked. The first layer 30 may be disposed above the second layer 40 and may be electrically connected to the second layer 40.

The first layer 30 may include a pixel array 15 in which a plurality of pixels are arranged in a two-dimensional array structure. The pixel array 15 may correspond to the pixel array 15 of FIG. 1.

The second layer 40 may include a logic region 18 in which logic elements are located. The logic elements included in the logic region 18 may be electrically connected to the pixel array 15 and may provide a signal to the pixel or process the signal output from the pixel. The logic region 18 may include, e.g., the control register block 11, the timing generator 12, the ramp signal generator 13, the row driver 14, the readout circuit 16, and the like of FIG. 1.

Figure 3:
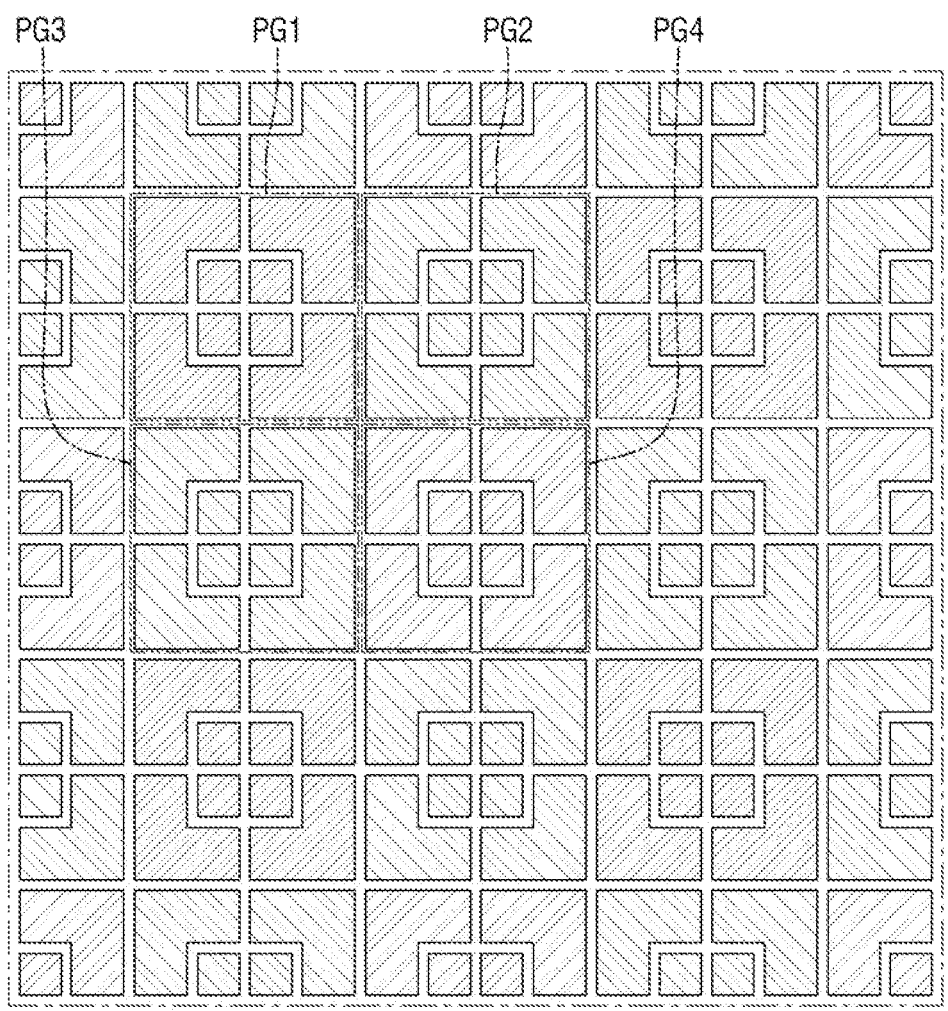
FIG. 3 is a diagram for explaining a pixel array according to some example embodiments.

FIG. 3 is a diagram for explaining a pixel array according to some example embodiments.

Referring to FIG. 3, a pixel array PA-1 according to some example embodiments may include a plurality of pixel groups, e.g., a first pixel group PG1, a second pixel group PG2, a third pixel group PG3, and a fourth pixel group PG4. The plurality of pixel groups PG1, PG2, PG3, and PG4 may be regularly arranged in a first direction X and a second direction Y. The first pixel group PG1 and the second pixel group PG2 may be arranged along the first direction X, and the third pixel group PG3 and the fourth pixel group PG4 may be arranged along the first direction X. The third pixel group PG3 and the first pixel group PG1 may be arranged along the second direction Y, and the fourth pixel group PG4 and the second pixel group GP2 may be arranged along the second direction Y.

A color filter having the same color may be disposed on each of the pixel groups PG1, PG2, PG3, and PG4. In another implementation, a color filter having a first color may be disposed on the first pixel group PG1, a color filter having a second color may be disposed on the second pixel group PG2, a color filter having a third color may be disposed on the third pixel group PG3, and color filter having a fourth color may be disposed on the fourth pixel group PG4. The first color may be red, the second and third colors may be green, the fourth color may be blue, and the color filters may be arranged in a Bayer pattern. In another example, the color filter may include a yellow filter, a magenta filter, and a cyan filter, and may further include a white filter. This may reduce the difficulty of the fabricating process of the image sensor.

Figure 4:
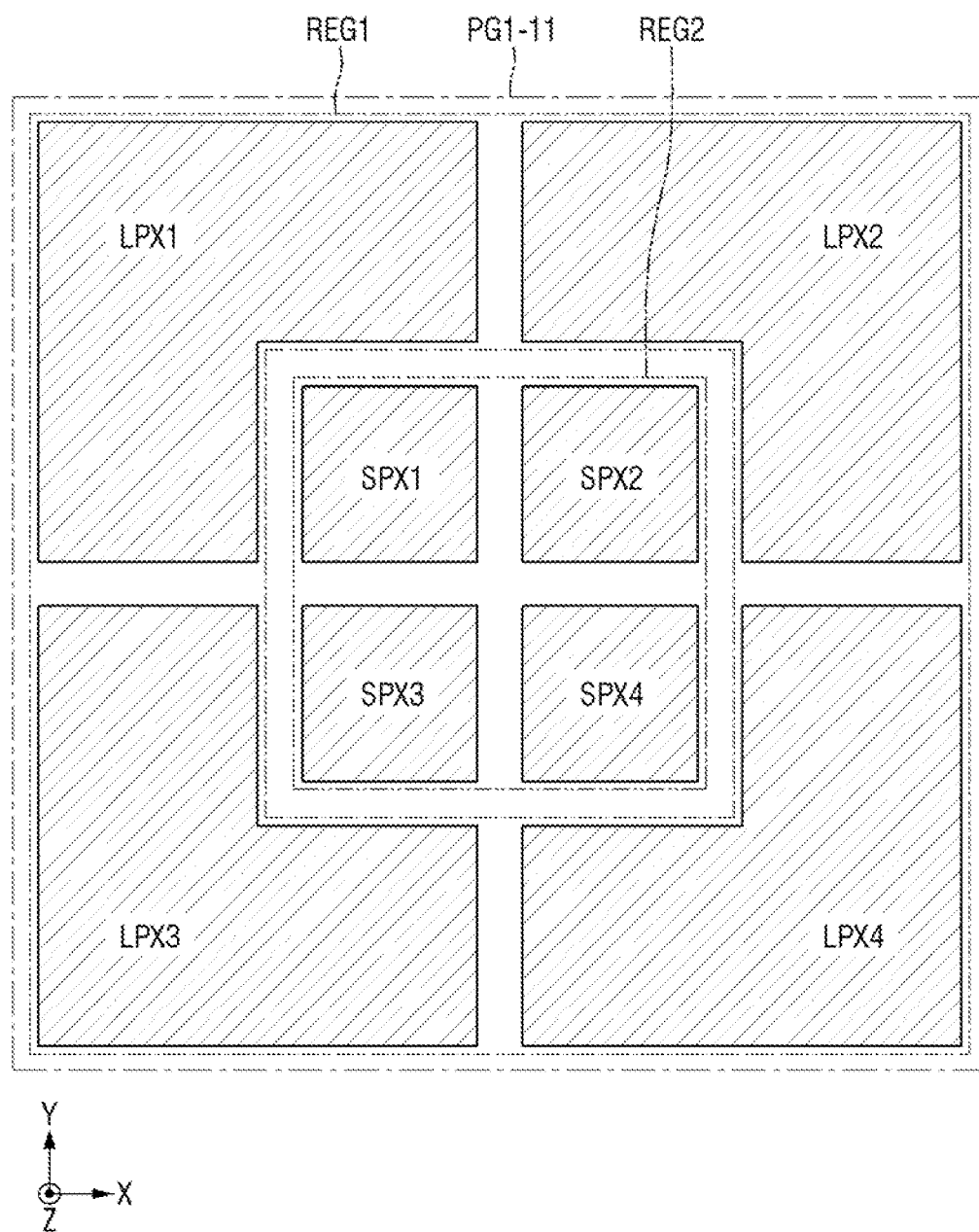
FIG. 4 is a diagram for explaining a first pixel group of FIG. 1.

FIG. 4 is a diagram for explaining the first pixel group of FIG. 3.

Since the second to fourth pixel groups PG2, PG3, and PG4 of FIG. 3 may be similar to the first pixel group PG1, the first pixel group PG1 will be mainly described below.

Referring to FIG. 4, a first pixel group PG1-11 according to some example embodiments may include a first region REG1 and a second region REG2.

The first region REG1 may include at least one first pixel including at least one first photodiode, e.g., first-1, first-2, first-3, and first-4 pixels LPX1, LPX2, LPX3, and LPX4 each including at least one first photodiode. The first-1 to first-4 pixels LPX1 to LPX4 may be referred to respectively or collectively as first pixels.

The second region REG2 may include at least one second pixel including a second photodiode, e.g., second-1, second-2, second-3, and second-4 pixels SPX1, SPX2, SPX3, and SPX4 each including a second photodiode. The second-1 to second-4 pixels SPX1 to SPX4 may be referred to respectively or collectively as second pixels.

At least one of at least one first pixel LPX1, LPX2, LPX3, and LPX4 and at least one second pixel SPX1, SPX2, SPX3, and SPX4 may be arranged in an m*n arrangement (m and n are natural numbers of 2 or more). For example, at least one first pixel and at least one second pixel may be paired and arranged in an m*n arrangement, wherein m and n are natural numbers of 2 or more. For example, the first region REG1 may include first pixels LPX1, LPX2, LPX3, and LPX4 arranged in a 2*2 arrangement, and the second region REG2 may include the second pixels SPX1, SPX2, SPX3, and SPX4 arranged in a 2*2 arrangement.

In plane view, referring to FIG. 4, the first region REG1 may surround, e.g., completely surround the second region REG2. In plane view, the first pixel group PG1-11 may have a rectangular shape, and the second region REG2 may have a rectangular shape. In plane view, the first pixels LPX1, LPX2, LPX3, and LPX4 may have a "A" or notched shape, and the second pixels SPX1, SPX2, SPX3, and SPX4 may have a rectangular shape.

In plane view, an area of the first region REG1 may be greater than an area of the second region REG2. In plane view, a total area of the first photodiode(s) included in the first region REG1 may be greater than a total area of the second photodiode(s) included in the second region REG2.

Figure 5:
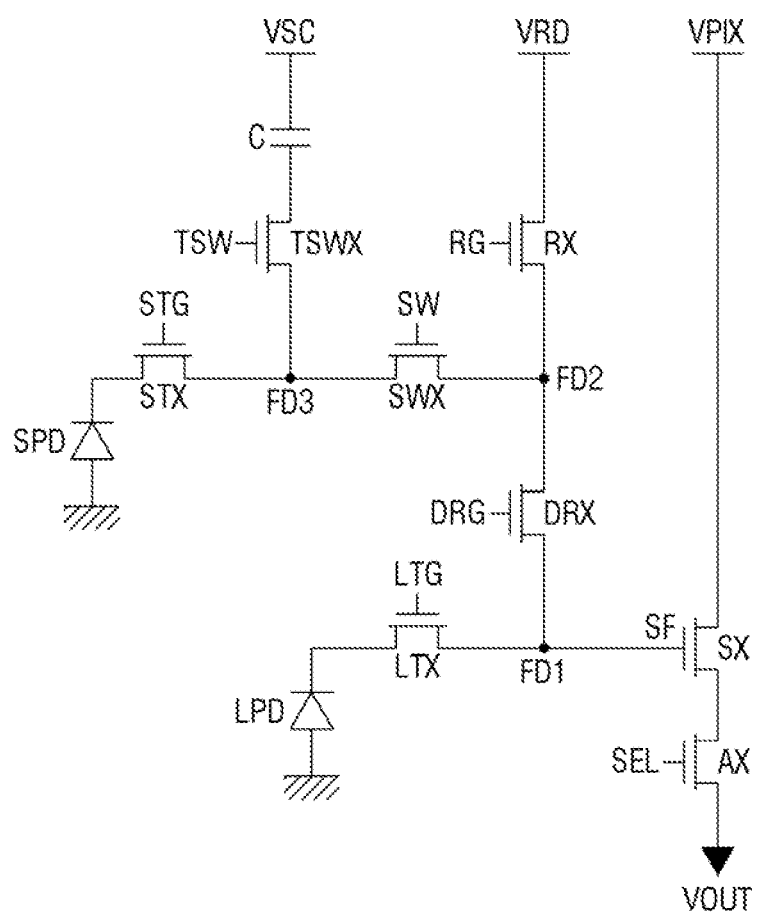
FIG. 5 is an example circuit diagram for explaining a first pixel and a second pixel of FIG. 4.
Figure 6:
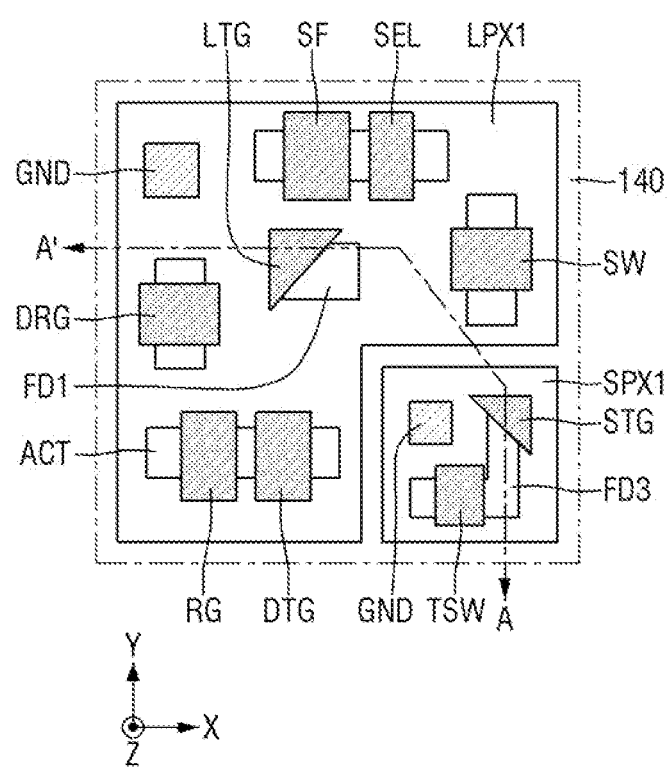
FIG. 6 is an example layout diagram for explaining the first pixel and the second pixel of FIG. 4.
Figure 7:
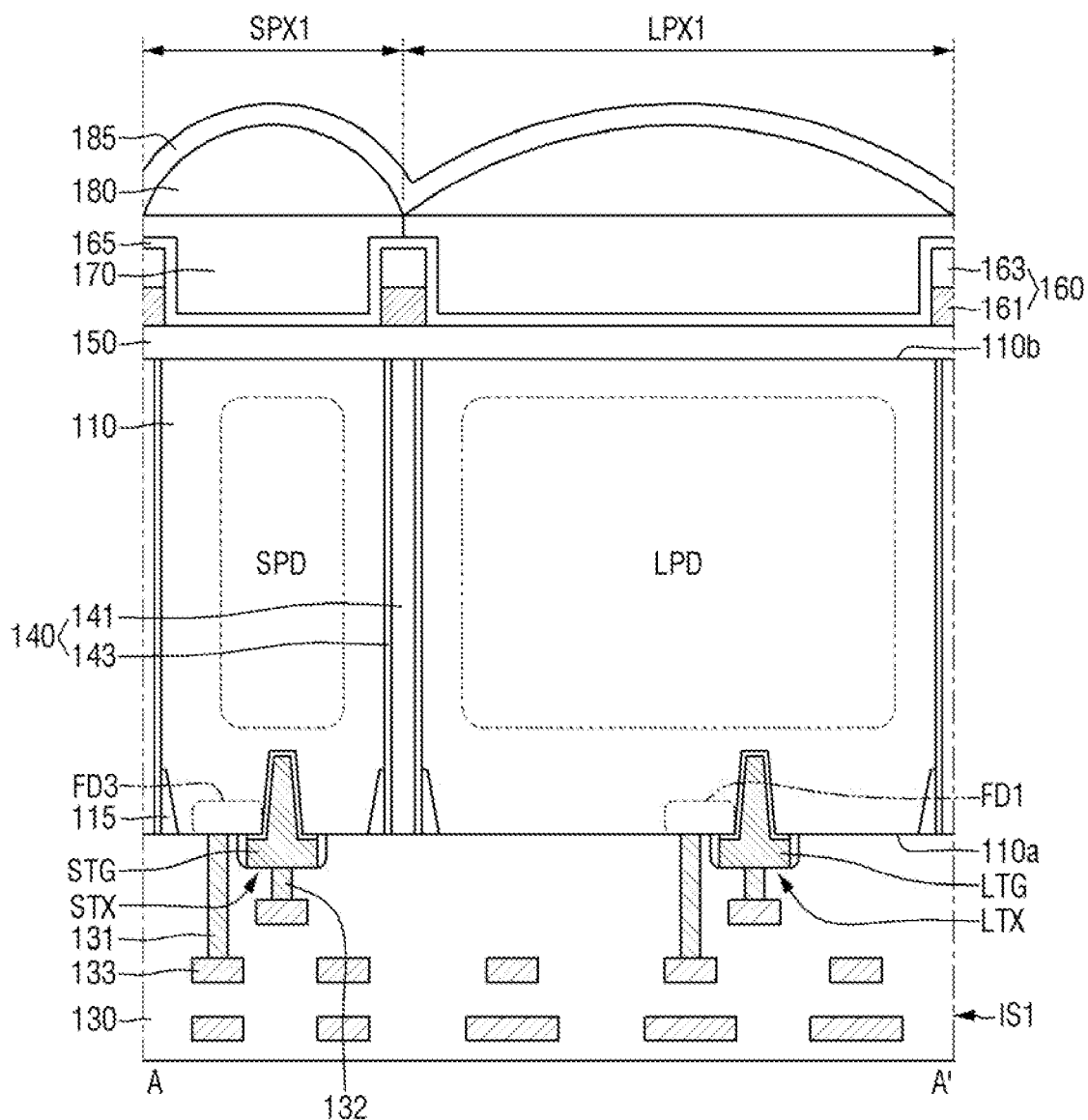
FIGS. 7 and 8 are example cross-sectional views taken along A-A' of FIG. 6.
Figure 8:
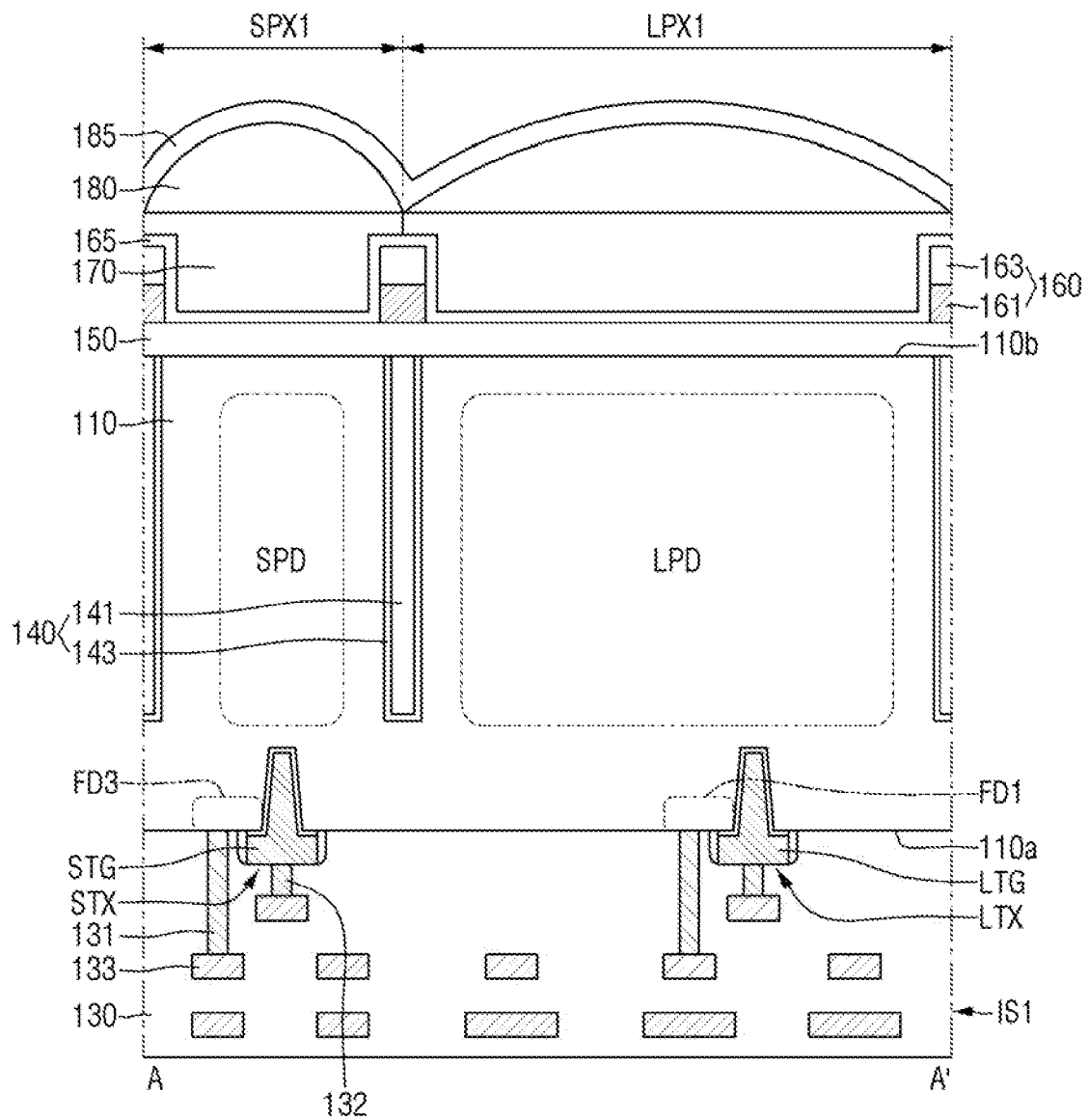
Figure 9:
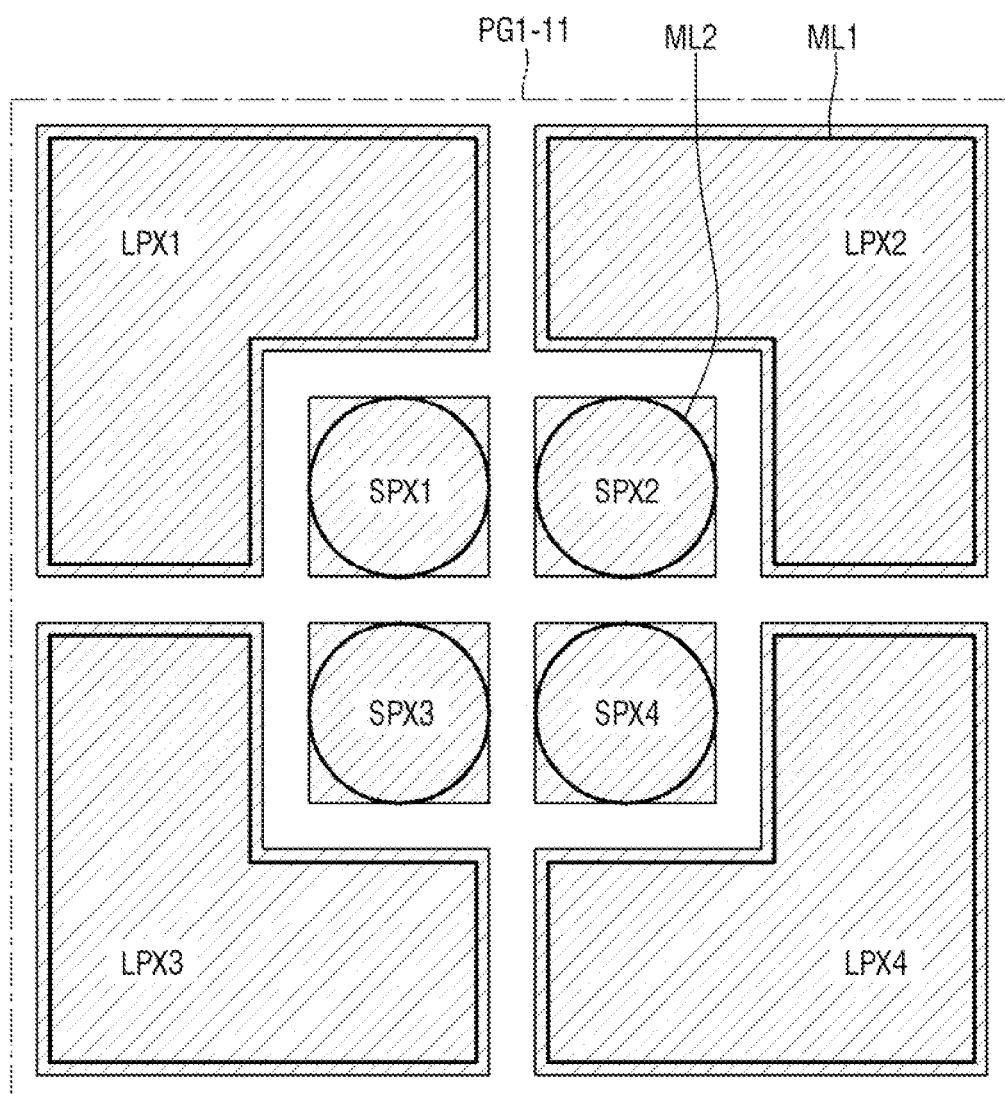
FIG. 9 is a diagram for explaining a microlens according to some example embodiments.

FIG. 5 is an example circuit diagram for explaining the first pixel and the second pixel of FIG. 4. FIG. 6 is an example layout diagram for explaining the first pixel and the second pixel of FIG. 4. FIGS. 7 and 8 are example cross-sectional views taken along A-A' of FIG. 6. FIG. 9 is a diagram for explaining the microlens according to some example embodiments.

Referring to FIGS. 4 and 5, the first pixel LPX1 may include a first photodiode LPD, a first floating diffusion region FD1, a first transfer transistor LTX between the first photodiode LPD and the first floating diffusion region FD1, and a connecting transistor DRX. The second pixel SPX1 may include a second photodiode SPD, a third floating diffusion region FD3, and a second transfer transistor STX between the second photodiode SPD and the third floating diffusion region FD3. The connecting transistor DRX may connect the first floating diffusion region FD1 and the third floating diffusion region FD3.

Referring to FIGS. 4 and 6, the first pixel LPX1 may include a grounded region GND, the first photodiode LPD, the first transfer transistor LTX, a source follower transistor SX, a selection transistor AX, the connecting transistor DRX, a reset transistor RX, and a first switch transistor SWX. The second pixel SPX2 may include the grounded region GND, a second switch transistor TSWX, the second photodiode SPD, and the second transfer transistor STX.

The first photodiode LPD may generate electric charges in proportion to the amount of light incident from the outside. The first photodiode LPD may convert the light incident on the first pixel LPX1 into electric charges. One end of the first photodiode LPD may be connected to a ground voltage.

The first transfer transistor LTX may be connected between the first photodiode LPD and the first floating diffusion region FD1. One end of the first transfer transistor LTX may be connected to the first photodiode LPD, and the other end of the first transfer transistor LTX may be connected to the first floating diffusion region FD1. The first transfer transistor LTX may be driven by a first transfer signal applied through a first transfer gate LTG of the first transfer transistor LTX. The first transfer transistor LTX may transfer the electric charges generated by the first photodiode LPD to the first floating diffusion region FD1.

A source follower gate SF of the source follower transistor SX may be connected to the first floating diffusion region FD1. The source follower gate SF may be connected to the first floating diffusion region FD1 to receive electric charges. The source follower transistor SX may amplify a change in electric potential of the first floating diffusion region FD1 and output it to an output voltage VOUT. When the source follower transistor SX is turned on, the source follower transistor SX may transfer a first voltage VPIX to the selection transistor AX.

The selection transistor AX may be connected to the source follower transistor SX and the output voltage VOUT. The selection transistor AX may select a pixel region to be read in row units. The selection transistor AX may be driven by a row selection signal applied to a selection gate SEL of the selection transistor AX.

The connecting transistor DRX may connect the first floating diffusion region FD1 and the second floating diffusion region FD2. The connecting transistor DRX may be driven by a connection signal to be applied to a connecting gate DRG of the connecting transistor DRX.

The reset transistor RX may be driven by a reset signal to be applied to the reset gate RG of the reset transistor RX. When the reset transistor RX is turned on, the reset transistor RX may transfer a second voltage VRD to the second floating diffusion region FD2. Accordingly, the first pixel LPX1 and the second pixel SPX1 may be reset.

The first switch transistor SWX may be located between the second floating diffusion region FD2 and the third floating diffusion region FD3. The first switch transistor SWX may be driven by a first switch signal to be applied to a first switch gate SW of the first switch transistor SWX. When the first switch transistor SWX is turned on, the first switch transistor SWX may connect the second floating diffusion region FD2 and the third floating diffusion region FD3.

A capacitor C and the second switch transistor TSWX may be located between a third voltage VSC and the third floating diffusion region FD3. The second switch transistor TSWX may be driven by a second switch signal to be applied to a second switch gate TSW of the second switch transistor TSWX. When the second switch transistor TSWX is turned on, the second switch transistor TSWX may connect the third floating diffusion region FD3 and the capacitor C. The second switch transistor TSWX may send electric charges that overflow from the second photodiode SPD to the capacitor C. The capacitor C may store the electric charges that overflow from the second photodiode SPD. The capacitor C may not be disposed in the first region REG1 and the second region REG2. For example, the capacitor C may be disposed in the second layer 40 of FIG. 2.

At least a part of the first to third voltages VPIX, VRD, and VSC may be equal to each other. Alternatively, the first to third voltages VPIX, VRD, and VSC may be different from each other.

The second photodiode SPD may generate electric charges in proportion to the amount of light incident from the outside. The second photodiode SPD may convert the light incident on the second pixel SPX1 into electric charges. One end of the second photodiode SPD may be connected to the ground voltage.

The second transfer transistor STX may be connected between the second photodiode SPD and the second floating diffusion region FD2. One end of the second transfer transistor STX may be connected to the second photodiode SPD, and the other end of the second transfer transistor STX may be connected to the third floating diffusion region FD3. The second transfer transistor STX may include a second transfer gate STG. The second transfer transistor STX may be driven by a second transfer signal, and the second transfer signal may be applied through the second transfer gate STG. The second transfer transistor STX may transmit electric charges generated by the second photodiode SPD to the third floating diffusion region FD3. The first floating diffusion region FD1 and the third floating diffusion region FD3 may be connected by the first switch transistor SWX and the connecting transistor DRX.

The first pixel LPX1 may further include a dummy transistor. Referring to FIG. 6, a dummy gate DTG of the dummy transistor may be disposed in the first pixel LPX1.

Referring to FIGS. 4, 7, and 8, the image sensor may include a first substrate 110, the first photodiode LPD, the second photodiode SPD, an element separation film 115, a pixel separation pattern 140, a surface insulating film 150, a grid pattern 160, a first protective film 165, a color filter 170, a microlens 180, and a second protective film 185.

The first substrate 110 may include a first side 110a and a second side 110b that are opposite to each other. In the description below, the first side 110a may be referred to as a front side of the first substrate 110, and the second side 110b may be referred to as a back side of the first substrate 110. The second side 110b of the first substrate 110 may be a light-receiving surface on which light is incident, e.g., the image sensor may be implemented as a backside illumination (BSI) image sensor.

The first substrate 110 may be a semiconductor substrate. For example, the first substrate 110 may be bulk silicon or silicon-on-insulator (SOI). The first substrate 110 may be a silicon substrate or may include other materials, e.g., silicon germanium, indium antimonide, lead tellurium compounds, indium arsenic, indium phosphide, gallium arsenide or gallium antimonide. In an implementation, the first substrate 110 may have an epitaxial layer formed on a base substrate.

The first substrate 110 may have a first conductive type. For example, the first substrate 110 may include p-type impurities (e.g., boron (B)). Although the first conductive type will be described as a p-type in the following description, this is merely by way of example, and the first conductive type may be an n-type.

The first pixel LPX1 and the second pixel SPX1 may be formed on the first substrate 110. The first photodiode LPD may be formed inside the first substrate 110 of the first pixel LPX1. The second photodiode SPD may be formed inside the first substrate 110 of the second pixel LPX2. The first photodiode LPD and the second photodiode SPD may have a second conductive type different from the first conductive type. Although the second conductive type will be described as an n-type in the following description, this is merely by way of example, and the second conductive type may be a p-type. The first photodiode LPD and the second photodiode SPD may be formed, e.g., by ion-implantation of an n-type impurity (e.g., phosphorus (P) or arsenic (As)) into the p-type first substrate 110. The first photodiode LPD and the second photodiode SPD may have a potential gradient in a direction (e.g., a vertical direction) that intersects the first side 110a and the second side 110b of the first substrate 110, e.g., the impurity concentrations of the first photodiode LPD and the second photodiode SPD may decrease from the first side 110a toward the second side 110b.

The area of the first pixel LPX1 may be greater than the area of the second pixel SPX1 in plane view. The area of the first photodiode LPD may be greater than the area of the second photodiode SPD in plane view.

The first floating diffusion region FD1 may be formed inside the first substrate 110 of the first pixel LPX1. The third floating diffusion region FD3 may be formed inside the first substrate 110 of the second pixel SPX1.

The first floating diffusion region FD1 and the third floating diffusion region FD3 may have the second conductive type. For example, the first floating diffusion region FD1 and the third floating diffusion region FD3 may be formed by ion-implantation of n-type impurities into the p-type first substrate 110.

Each of the first floating diffusion region FD1 and the third floating diffusion region FD3 may have the second conductive type at an impurity concentration higher than those of each of the first photodiode LPD and the second photodiode SPD. For example, the first floating diffusion region FD1 and the third floating diffusion region FD3 may be formed by ion-implantation of n-type impurities of a high concentration (n+) into the p-type first substrate 110.

The first transfer transistor LTX and the second transfer transistor STX may be formed on the first side 110a of the first substrate 110. The first transfer transistor LTX may include the first transfer gate LTG, a first gate insulating film, and a first gate spacer. The first gate insulating film may be disposed between the first transfer gate LTG and the first substrate 110. The first gate spacer may be disposed on both side walls of the first transfer gate LTG. The second transfer transistor STX may include the second transfer gate STG, a second gate insulating film, and a second gate spacer. The second gate insulating film may be disposed between the second transfer gate STG and the first substrate 110. The second gate spacer may be disposed on both side walls of the second transfer gate STG. The first transfer gate LTG and the second transfer gate STG may be vertical transfer gates, and at least a part of the gates of the first transfer gate LTG and the second transfer gate STG may be embedded in the first substrate 110. For example, a trench extending from the first side 100a of the first substrate 110 may be formed in the first substrate 110, and at least a part of the gates of the first transfer gate LTG and the second transfer gate STG may be formed to fill the trench. Therefore, lower surfaces of the first transfer gate LTG and the second transfer gate STG may be disposed inside the first substrate 110. Widths of the first transfer gate LTG and the second transfer gate STG may each decrease in a direction going away from the first side 110a of the first substrate 110, e.g., due to the features of the etching process for forming the trenches.

A first wiring structure IS1 may be formed on the first substrate 110. The first wiring structure IS1 may be formed, e.g., on the first side 110a of the first substrate 110. Further, the first wiring structure IS1 may cover, e.g., the first side 110a of the first substrate 110.

The first wiring structure IS1 may be made up of one or more wirings. For example, the first wiring structure IS1 may include a first wiring insulation film 130, and a plurality of first wirings 133, a plurality of first contacts 131, and a plurality of second contacts 132 inside the first wiring insulation film 130. The illustrated number of layers of the wiring 133 and the first contacts 131 and the second contacts 132 constituting the first wiring structure IS1 and the arrangement thereof are merely an example, and may be varied.

The first wiring 133 may be electrically connected to the first pixel LPX1 and the second pixel SPX1. For example, the first wiring 133 may be connected to the first substrate 110 through the first contact 131, and may be connected to the first transfer gate LTG of the first transfer transistor LTX or the second transfer gate STG of the second transfer transistor STX through the second contact 132.

The first wiring insulation film 130 may include, e.g., silicon oxide, silicon nitride, silicon oxynitride, or a low dielectric constant (low-k) material having a lower dielectric constant than silicon oxide. The first wiring 133, the first contact 131, and the second contact 132 may include a conductive material, e.g., the first wiring 133, the first contact 131, and the second contact 132 may include tungsten (W), copper (Cu), aluminum (Al), gold (Au), silver (Ag), or alloys thereof.

The pixel separation pattern 140 may be formed to surround the first pixel LPX1 and the second pixel SPX1 in plane view. The pixel separation pattern 140 may separate, e.g., define, the first pixel LPX1 and the second pixel SPX1. The pixel separation pattern 140 may be formed inside the first substrate 110. The pixel separation pattern 140 may be formed, e.g., by being embedded in a deep trench formed by patterning the first substrate 110.

Referring to FIG. 7, in some example embodiments, the pixel separation pattern 140 may penetrate the first substrate 110. For example, the pixel separation pattern 140 may extend from the first side 110a to the second side 110b.

A width of the pixel separation pattern 140 may be the same or constant in a direction going away from the first side 110a of the first substrate 110. In the present specification, the meaning of term "same" includes not only completely identical but also minute differences that may occur due to process margins and the like.

Alternatively, the width of the pixel separation pattern 140 may decrease in a direction going away from the first side 110a of the first substrate 110, e.g., due to the features of the etching process for forming the pixel separation pattern 140. The process of etching the first substrate 110 to form the pixel separation pattern 140 may be performed on the first side 110a of the first substrate 110.

Referring to FIG. 8, in some example embodiments, the pixel separation pattern 140 may penetrate a part of the first substrate 110, e.g., only partially penetrate. For example, the pixel separation pattern 140 may penetrate a part of the first substrate 110 from the second side 110b of the first substrate 110. A bottom surface of the pixel separation pattern 140 may be disposed inside the first substrate 110. The bottom surface of the pixel separation pattern 140 may be based on a third direction DR3, which is a direction from the first side 110a to the second side 110b of the first substrate 110.

The pixel separation pattern 140 may include a conductive filling pattern 141 and an insulating spacer film 143. The insulating spacer film 143 may extend along the side surfaces of the trench inside the first substrate 110. The conductive filling pattern 141 may be disposed on the insulating spacer film 143 and may fill the rest of the trench. The insulating spacer film 143 may separate the conductive filling pattern 141 from the first substrate 110.

Referring to FIG. 7, the element separation film 115 may be formed inside the first substrate 110. The element separation film 115 may be formed, e.g., by embedding an insulating material in a shallow trench formed by patterning the first substrate 110. The element separation film 115 may be adjacent to the first side 110a of the first substrate 110. For example, the element separation film 115 may extend from the first side 110a of the first substrate 110. The element separation film 115 may surround the active region ACT, and may define the active region ACT.

Referring to FIGS. 5 and 6, the source follower gate SF, the selection gate SEL, the first switch gate SW, the first transfer gate LTG, the dummy gate DTG, the first floating diffusion region FD1, the reset gate RG, and the connecting gate DRG may be formed on the active region ACT inside the first pixel LPX1. The second switch gate TSW, the second transfer gate STG, and the third floating diffusion region FD3 may be formed on the active region ACT inside the second pixel SPX1.

Referring to FIG. 7, a width of the element separation film 115 may decrease in a direction going away from the first side 110a of the first substrate 110. This may be due to the features of the process of etching the element separation film 115. For example, the process of etching the first substrate 110 to form the element separation film 115 may be performed on the first side 110a of the first substrate 110. In another implementation, the width of the element separation film 115 may be constant in the direction going away from the first side 110a of the first substrate 110.

The element separation film 115 may overlap the pixel separation pattern 140. A part of the pixel separation pattern 140 may be formed inside the element separation film 115. The pixel separation pattern 140 may penetrate the element separation film 115.

The element separation film 115 may include an insulating material. The element separation film 115 may include, e.g., at least one of silicon nitride, silicon oxide, and silicon oxynitride.

The surface insulating film 150 may be formed on the second side 110b of the first substrate 110. The surface insulating film 150 may cover the second side 110b of the first substrate 110.

The surface insulating film 150 may include an insulating material. For example, the surface insulating film 150 may include silicon oxide, silicon nitride, silicon oxynitride, aluminum oxide, hafnium oxide, and a combination thereof. Also, in some embodiments, the surface insulating film 150 may be formed of a multi-film. For example, the surface insulating film 150 may include an aluminum oxide film, a hafnium oxide film, a silicon oxide film, a silicon nitride film, and a hafnium oxide film which are sequentially stacked on the first side 110a of the first substrate 110.

The surface insulating film 150 may function as an antireflection film to prevent reflection of the light that is incident on the first substrate 110, thereby improving the light-receiving rate of the photodiode 116. Further, the surface insulating film 150 may function as a flattening film to form a color filter 170 and a microlens 180, which will be described below, at a uniform height.

The color filter 170 may be formed on the surface insulating film 150. The color filter 170 may be arranged to correspond to each of the first pixel LPX1 and the second pixel SPX1. For example, the plurality of color filters 170 may be arranged two-dimensionally (for example, in the form of a matrix) in a plane including the first direction X and the second direction Y. The color filter 170 may have various color filters depending on the pixel groups (PG1, PG2, PG3, and PG4 of FIG. 3).

The grid pattern 160 may be formed between the color filters 170. The grid pattern 160 may be formed on the surface insulating film 150. The grid pattern 160 is formed in a grid pattern in plane view and may be interposed between the color filters 170.

The grid pattern 160 may include a conductive pattern 161 and a low refractive index pattern 163. The conductive pattern 161 and the low refractive index pattern 163 may be sequentially stacked on, e.g., the surface insulating film 150 such that the conductive pattern 161 is between the low refractive index pattern 163 and the surface insulating film 150.

The conductive pattern 161 may include a conductive material, e.g., at least one of titanium (Ti), titanium nitride (TiN), tantalum (Ta), tantalum nitride (TaN), tungsten (W), aluminum (Al), copper (Cu), and a combination thereof. The conductive pattern 161 may prevent electric charges generated by electrostatic discharge (ESD) or the like from accumulating on the surface of the first substrate 110 (for example, the first side 110a) to effectively prevent an ESD bruise defect.

The low refractive index pattern 163 may include a low refractive index material having a lower refractive index than silicon (Si), e.g., at least one of silicon oxide, aluminum oxide, tantalum oxide, and combinations thereof. The low refractive index pattern 163 may improve the light collection efficiency by refracting or reflecting the obliquely incident light, and may improve the quality of the image sensor.

The first protective film 165 may be formed on the surface insulating film 150 and the grid pattern 160. For example, the first protective film 165 may conformally extend along the profiles of the upper surface of the surface insulating film 150, and the side surface and the upper surface of the grid pattern 160, interposed between the upper surface of the surface insulating film 150 and the side surface and the upper surface of the grid pattern 160 and the color filter 170.

The first protective film 165 may include, e.g., aluminum oxide. The first protective film 165 may prevent damage to the surface insulating film 150 and the grid pattern 160.

The microlens 180 may be formed on the color filter 170. The microlens 180 may have a convex shape and may have a predetermined radius of curvature, and may collect the light incident on the first photodiode LPD and the second photodiode SPD. The microlens 180 may include, e.g., a light transmissive resin.

A plurality of microlenses 180 may be arranged two-dimensionally (for example, in the form of a matrix) in a plane including the first direction X and the second direction Y. One microlens 180 may be arranged to correspond to each of the first pixel LPX1 and the second pixel SPX1. Specifically, referring to FIG. 9, a first microlens ML1 may be arranged to correspond to each of the first pixels LPX1, LPX2, LPX3, and LPX4, and a second microlens ML2 may be arranged to correspond to each of the second pixels SPX1, SPX2, SPX3, and SPX4. The first microlens ML1 may have a polygonal shape and the second microlens ML2 may have a nearly circular shape in plane view. The first microlens ML1 may have an "A" or notched shape in plane view.

Referring to FIGS. 7 and 8, the second protective film 185 may be formed on the microlens 180. The second protective film 185 may extend along the surface of the microlens 180. The second protective film 185 may include, e.g., an inorganic oxide film. For example, the second protective film 185 may include at least one of silicon oxide, titanium oxide, zirconium oxide, hafnium oxide, and combinations thereof. The second protective film 185 may include a low temperature oxide (LTO).

The second protective film 185 may protect the microlens 180 from the outside. For example, the second protective film 185 may protect the microlens 180 including an organic material by including an inorganic oxide film. Further, the second protective film 185 may improve the quality of the image sensor by improving the light collection efficiency of the microlens 180. For example, the second protective film 185 may reduce reflection, refraction, scattering, and the like of incident light that reaches the space between the microlenses 180 by filling the space between the microlenses 180.

Figure 10:
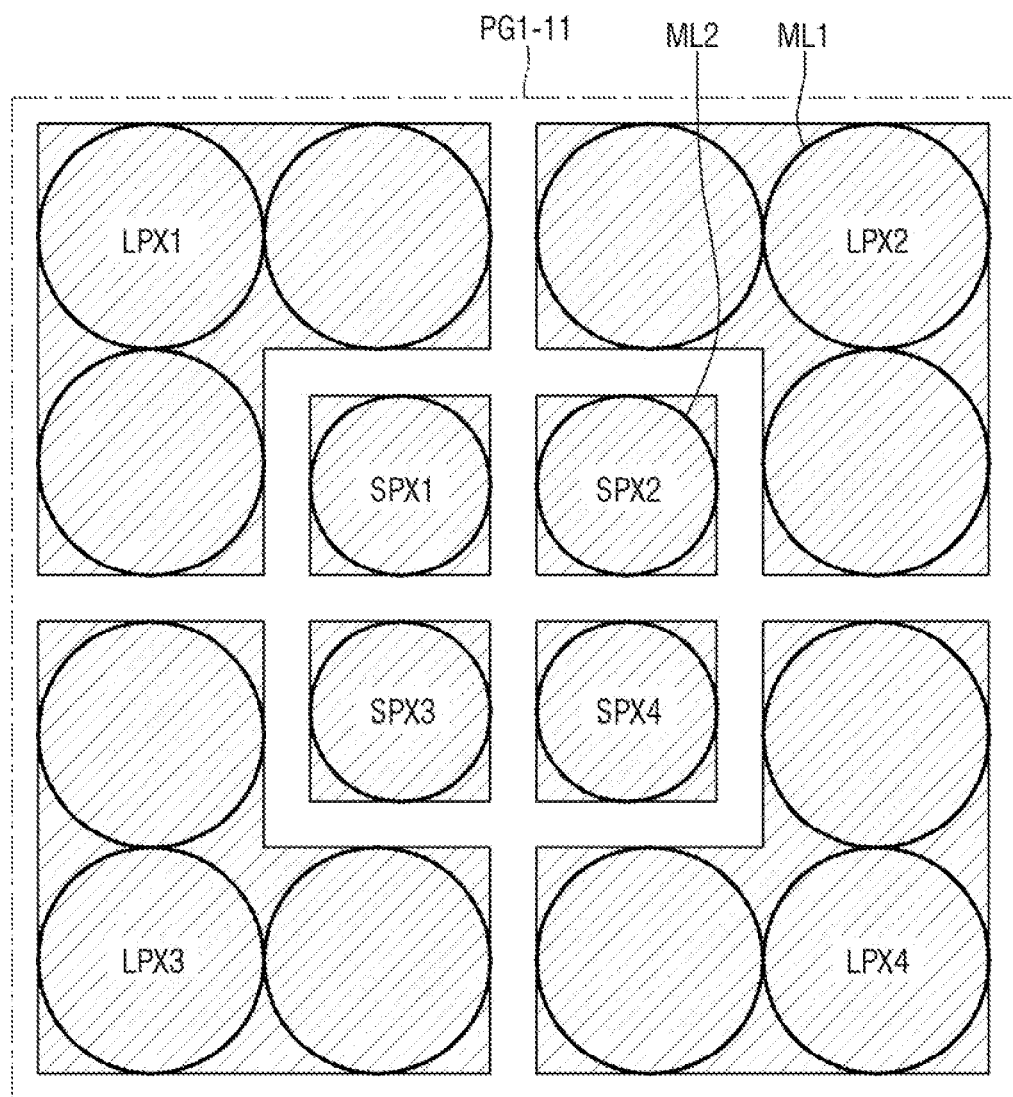
FIG. 10 is a diagram for explaining the microlens according to some example embodiments.

FIG. 10 is a diagram for explaining the microlens according to some example embodiments. For convenience of explanation, points different from those described using FIGS. 1 to 9 will be mainly described.

Referring to FIG. 10, according to some example embodiments, for each of the first pixels LPX1, LPX2, LPX3, and LPX4, a plurality of first microlenses ML1 may be provided, whereas, for each of the second pixels SPX1, SPX2, SPX3, and SPX4, a respective second microlens ML2 may be provided. That is, a plurality of first microlenses ML1 may be disposed on each of the first pixels LPX1, LPX2, LPX3, and LPX4, and one first second microlens ML2 may be disposed on each of the second pixels SPX1, SPX2, SPX3, and SPX4.

In plane view, the first microlens ML1 and the second microlens ML2 may have a nearly circular shape. In plane view, the area of each first microlens ML1 may be the same as or greater than that of each second microlens ML2.

FIGS. 11 and 13 to 15 are diagrams for explaining the first pixel group of FIG. 3 according to some example embodiments. FIG. 12 is an example circuit diagram for explaining a first pixel and a second pixel of FIG. 13.

For convenience of explanation, points different from those described using FIGS. 1 to 10 will be mainly described.

Figure 11:
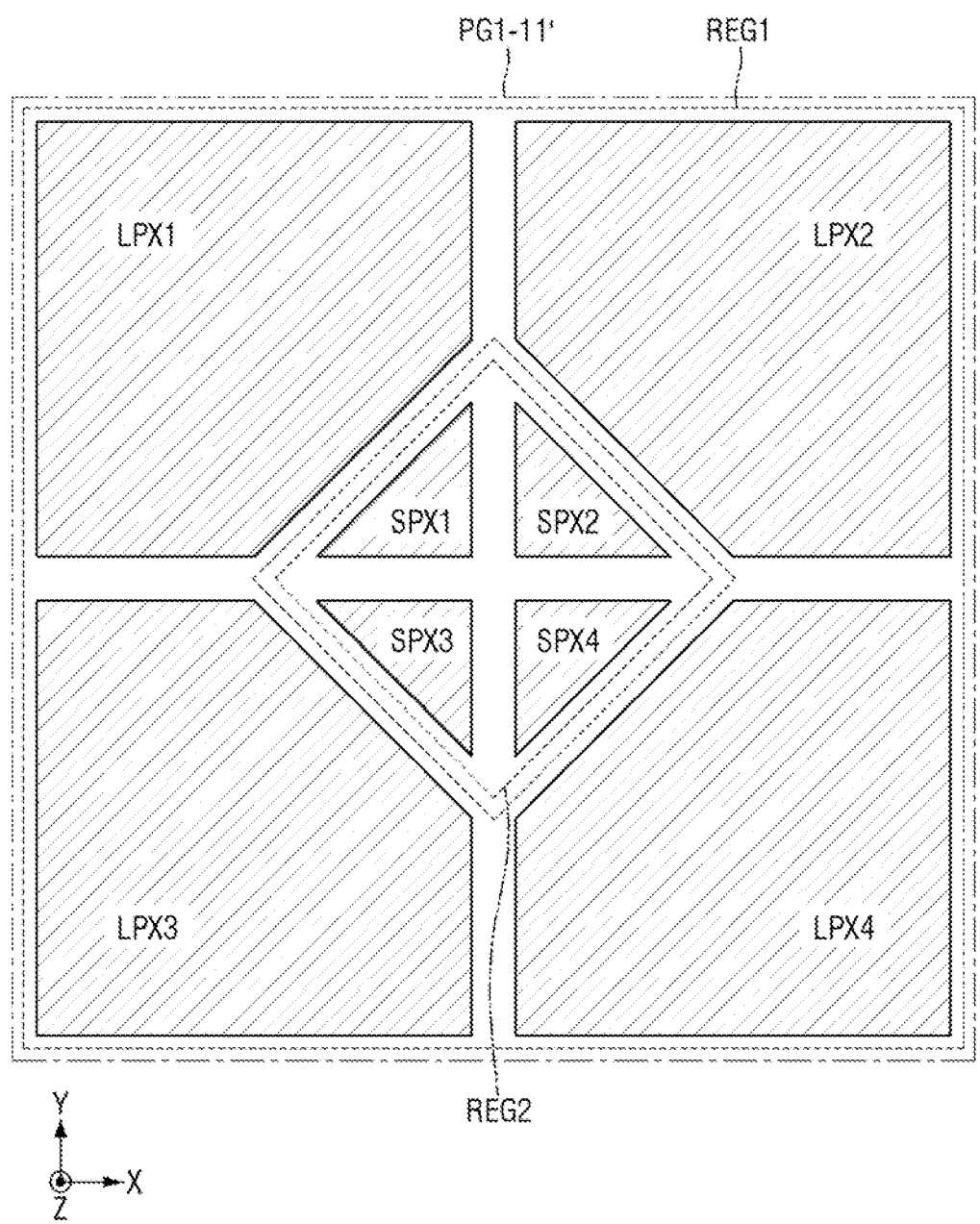
FIGS. 11 and 13 to 15 are diagrams for explaining the first pixel group of FIG. 3.
Figure 12:
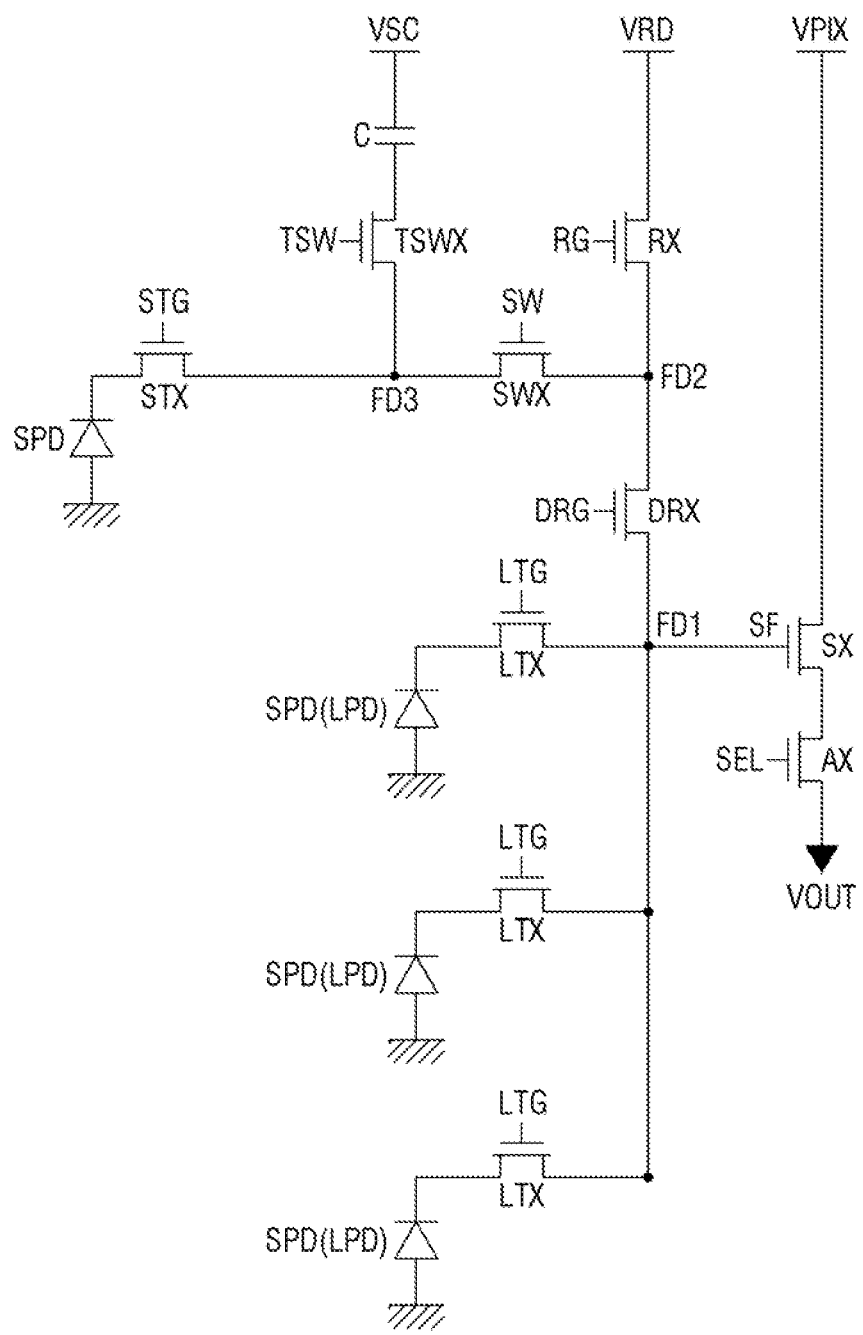
FIG. 12 is an example circuit diagram for explaining a first pixel and a second pixel of FIG. 13.

Referring to FIG. 11, a first pixel group PG1-11' according to some example embodiments may have a rectangular shape, e.g., overall, and the second region REG2 may have a rhombic shape in plane view. The second pixels SPX1, SPX2, SPX3, and SPX4 may each have a triangular shape in plane view.

Referring to FIGS. 12 to 15, according to some example embodiments, each of the first pixels LPX1, LPX2, LPX3, and LPX4 arranged in 2*2 in the first pixel group PG1 (e.g., PG1-12 in FIG. 13, PG1-13 in FIG. 14, and PG1-14 in FIG. 15) may include a plurality of sub-pixels SLPX. Each sub-pixel SLPX may include the first photodiode LPD, the first floating diffusion region FD1, and the first transfer transistor LTX between the first photodiode LPD and the first floating diffusion region FD1.

Figure 13:
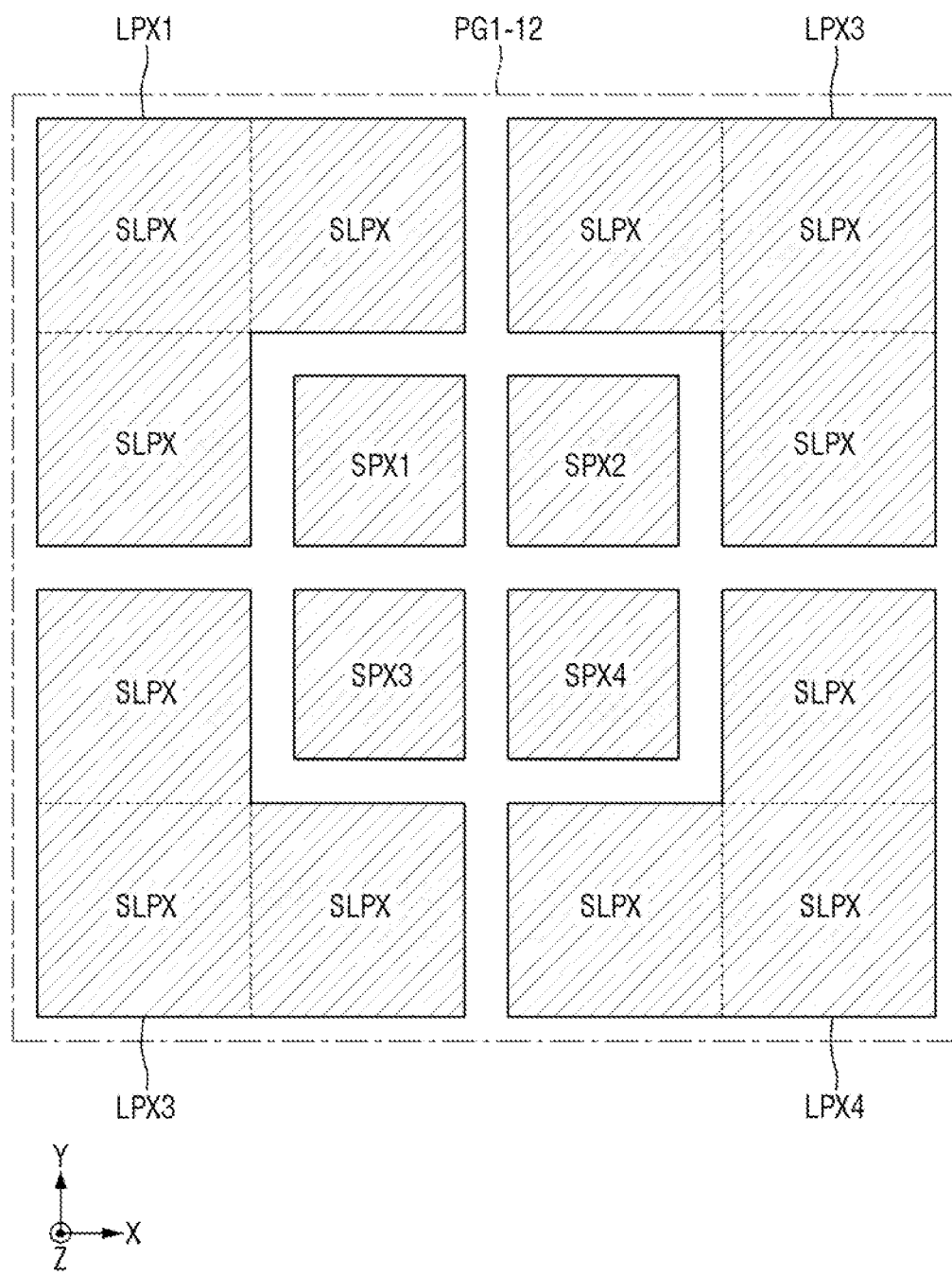

Referring to FIGS. 12 and 13, according to some example embodiments, each of the first pixels LPX1, LPX2, LPX3, and LPX4 in the first pixel group PG1-12 may include three sub-pixels SLPX. The sub-pixel SLPX may be the same as each of the second pixels SPX1, SPX2, SPX3, and SPX4. That is, the first photodiode LPD may be the same as the second photodiode SPD. In plane view, the area of one first photodiode LPD may be the same as the area of one second photodiode SPD.

For example, referring to the first pixel LPX1 and the second pixel SPX1, a part of the sub-pixels SLPX arranged in 2*2 and each including the first photodiode LPD may be the second pixel SPX1, and the rest may be the first pixel LPX1. For example, the second pixel SPX1 may include one second photodiode SPD, and the first pixel LPX1 may include three first photodiodes LPD. In an implementation, the second pixel SPX1 may include one first photodiode LPD, and the first pixel LPX1 may include three first photodiodes LPD. Although the sizes of the sub-pixel SLPX and the second pixel SPX1 are shown to be different in the drawing, this is only for distinguishing the first pixel LPX1 and the second pixel SPX1 from each other, and the sub-pixel SLPX and the second pixel SPX1 may have the same size.

Figure 14:
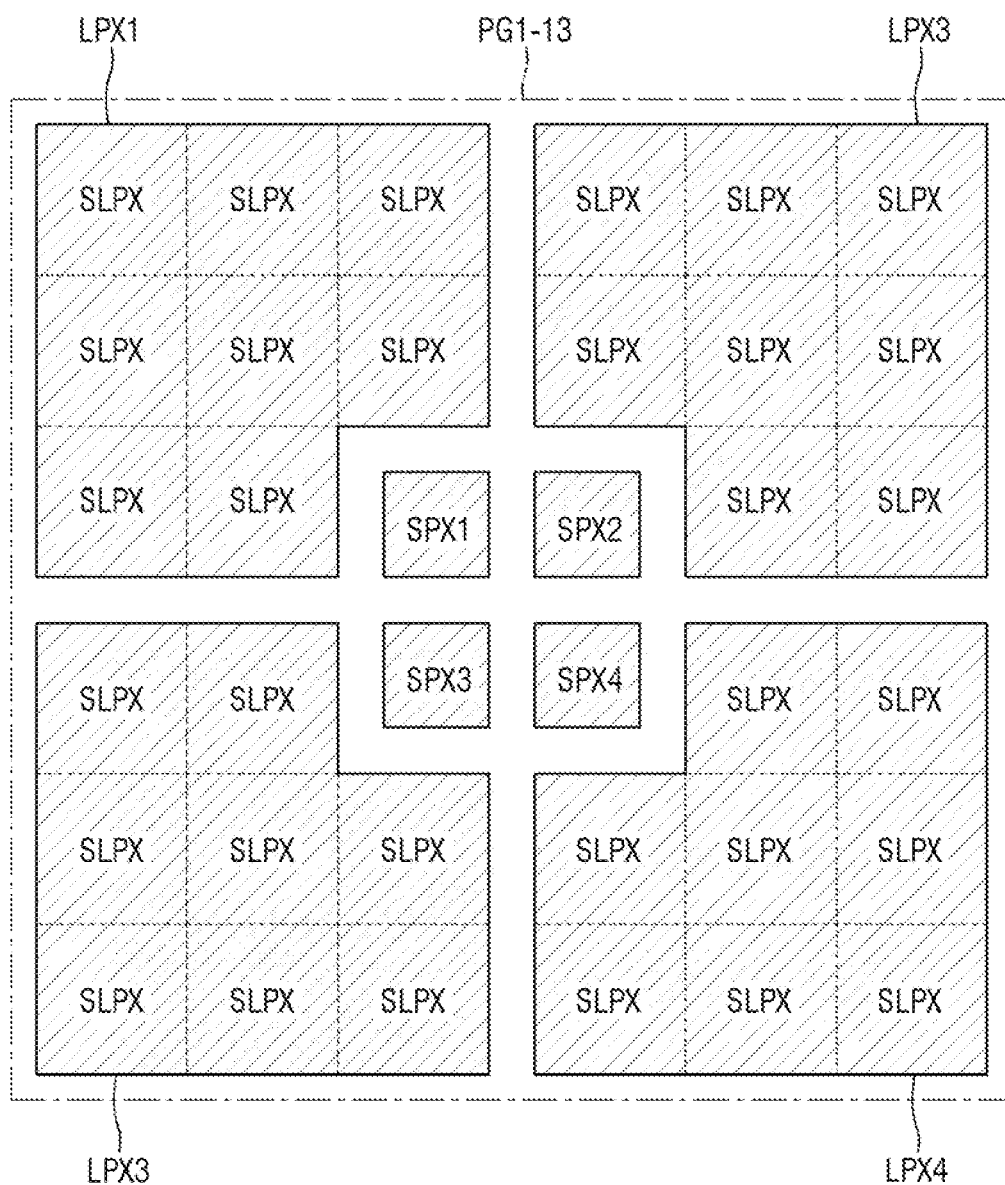

Referring to FIG. 14, according to some example embodiments, each of the first pixels LPX1, LPX2, LPX3, and LPX4 arranged in 2*2 in the first pixel group PG1-13 may include eight sub-pixels SLPX. The sub-pixel SLPX may be the same as each of the second pixels SPX1, SPX2, SPX3, and SPX4. That is, the first photodiode LPD may be the same as the second photodiode SPD. In plane view, the area of one first photodiode LPD may be the same as the area of one second photodiode SPD.

For example, referring to the first pixel LPX1 and the second pixel SPX1, a part of the sub-pixels SLPX which are arranged in 3*3 and each include the first photodiode LPD may be the second pixel SPX1, and the rest may be the first pixel LPX1. For example, the second pixel SPX1 may include one second photodiode SPD, and the first pixel LPX1 may include eight first photodiodes LPD. In an implementation, the second pixel SPX1 may include one first photodiode LPD, and the first pixel LPX1 may include eight first photodiodes LPD. The ratio of the sub-pixel SLPX that is the second pixel SPX1 among the sub-pixels SLPX arranged in 3*3 may vary.

Figure 15:
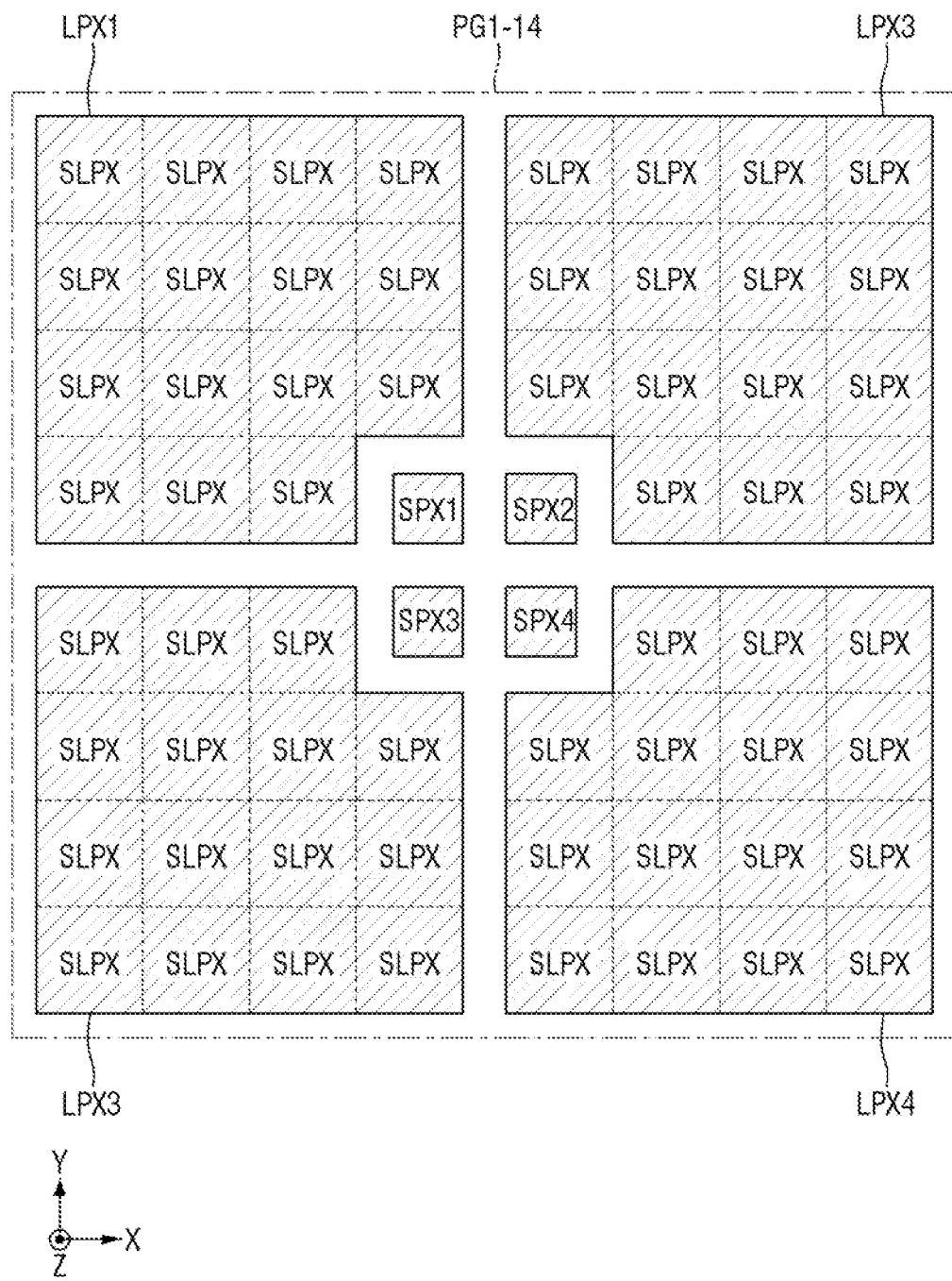

Referring to FIG. 15, according to some example embodiments, each of the first pixels LPX1, LPX2, LPX3, and LPX4 arranged in 2*2 in the first pixel groups PG1-14 may include fifteen sub-pixels SLPX. The sub-pixel SLPX may be the same as each of the second pixels SPX1, SPX2, SPX3, and SPX4. The first photodiode LPD may be the same as the second photodiode SPD. In plane view, the area of one first photodiode SPD may be the same as the area of one second photodiode SPD.

For example, referring to the first pixel LPX1 and the second pixel SPX1, a part of the sub-pixels SLPX which are arranged in 4*4 and each include the first photodiode LPD may be the second pixel SPX1, and the rest may be the first pixel LPX1. For example, the second pixel SPX1 may include one second photodiode SPD, and the first pixel LPX1 may include fifteen first photodiodes LPD. In an implementation, the second pixel SPX1 may include one first photodiode LPD, and the first pixel LPX1 may include fifteen first photodiodes LPD. The ratio of the second pixel SPX1 among the sub-pixels SLPX arranged in 4*4 may vary.

Figure 16:
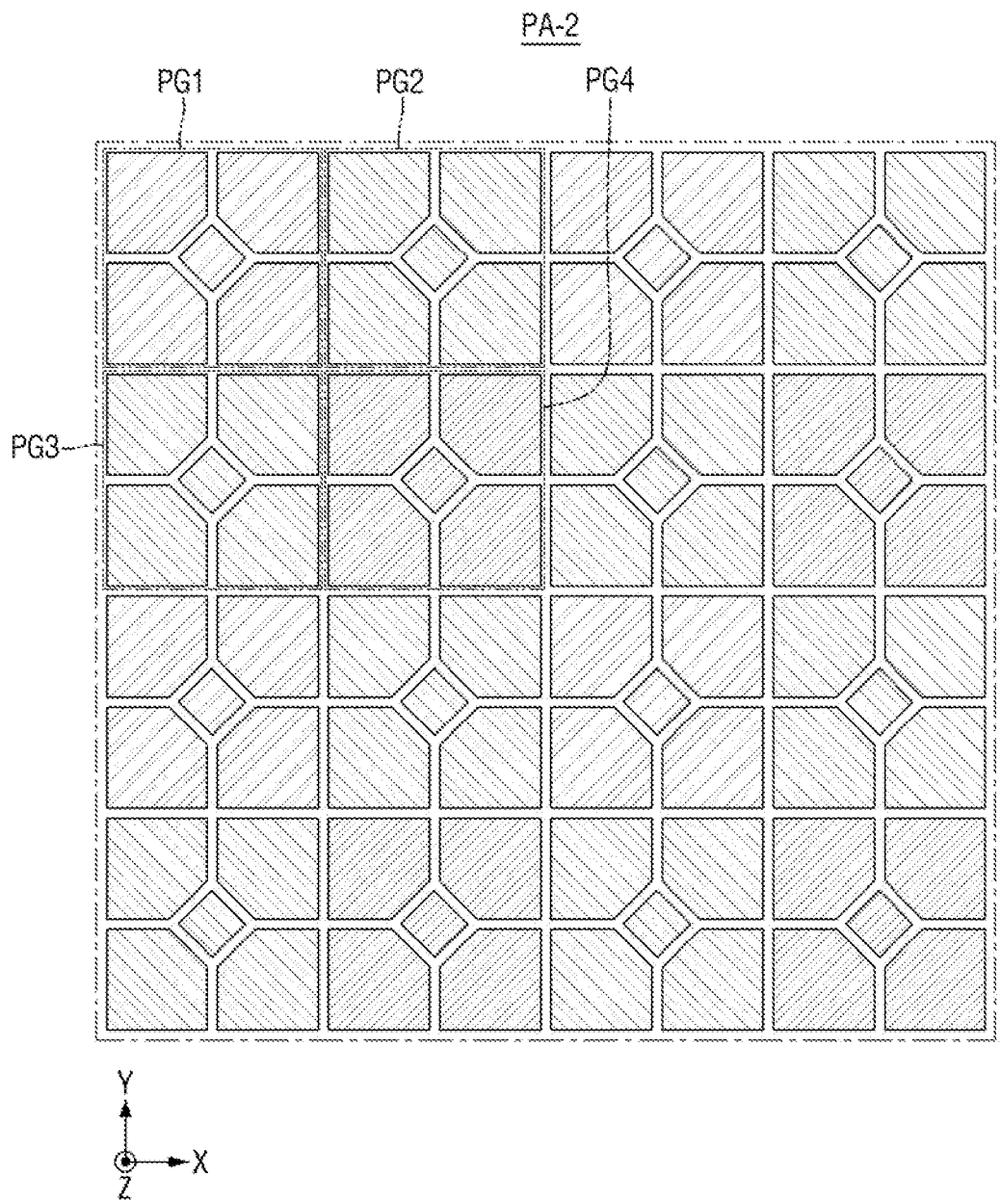
FIG. 16 is a diagram for explaining a pixel array according to some example embodiments.

FIG. 16 is a diagram for explaining the pixel array according to some example embodiments. For convenience of explanation, points different from those described using FIGS. 1 to 15 will be mainly described.

Referring to FIG. 16, a pixel array PA-2 according to some example embodiments may include a plurality of pixel groups PG1, PG2, PG3, and PG4. A color filter having the same color may be disposed on each of the pixel groups PG1, PG2, PG3, and PG4. For example, the color filter disposed on the first pixel group PG1 may have a blue color, the color filter disposed on the second and third pixel groups PG2 and PG3 may have a green color, and a color filter disposed on the fourth pixel group PG4 may have a red color. This is merely an example, and the color filter may include a yellow filter, a magenta filter, and a cyan filter, and may further include a white filter.

Figure 17:
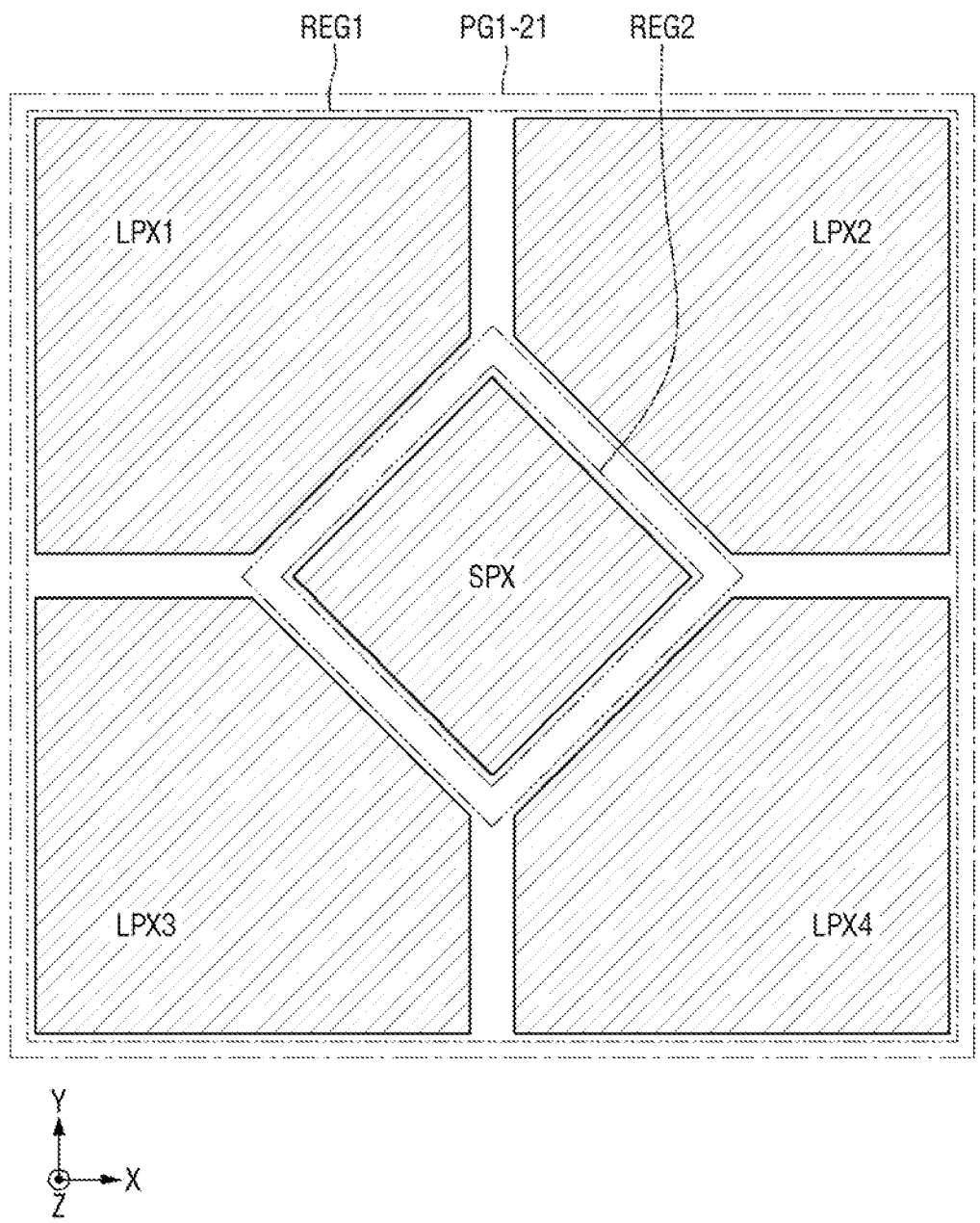
FIG. 17 is a diagram for explaining the first pixel group of FIG. 16.
Figure 18:
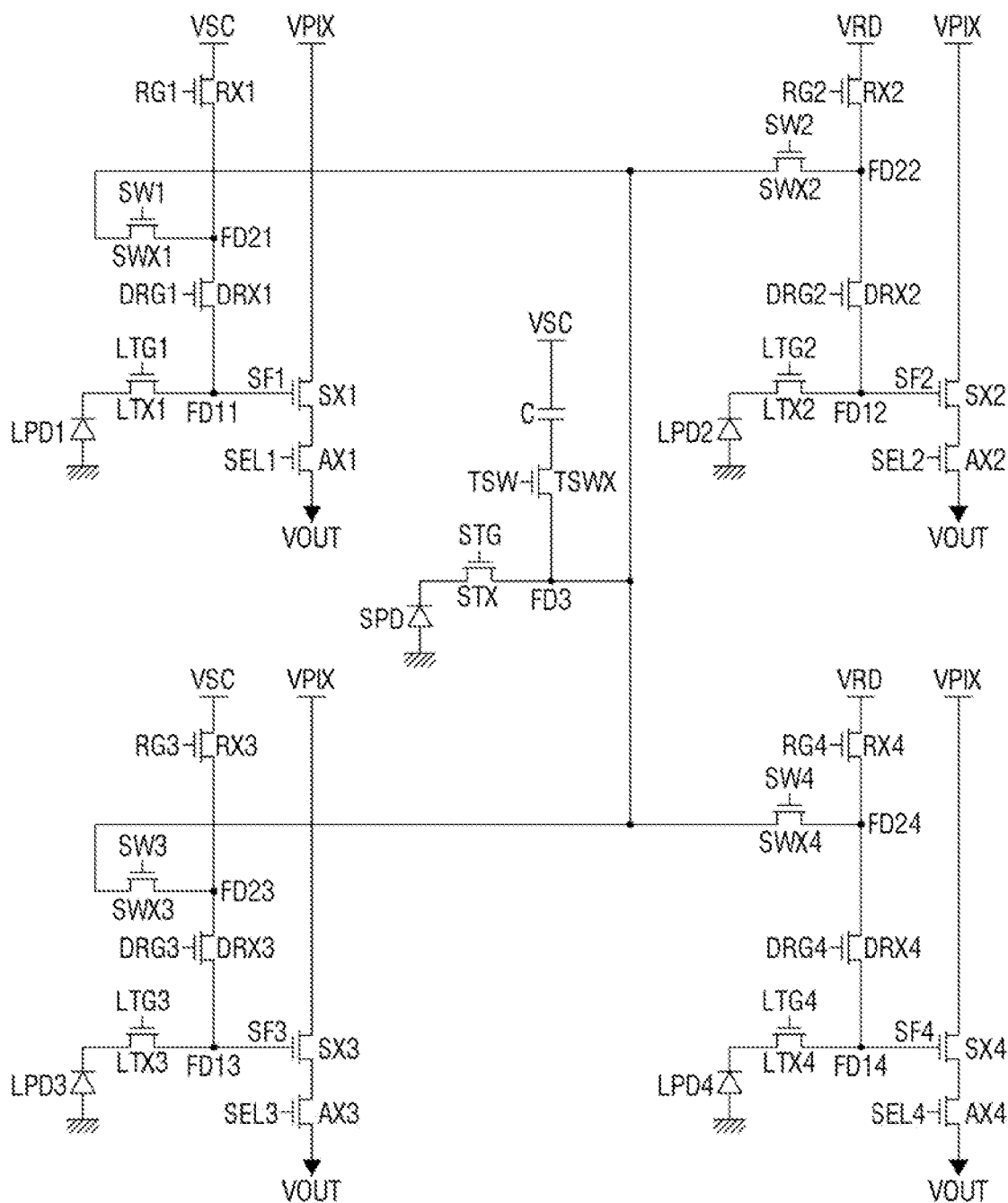
FIGS. 18 and 20 are example circuit diagrams for explaining a first pixel group of FIG. 17.
Figure 19:
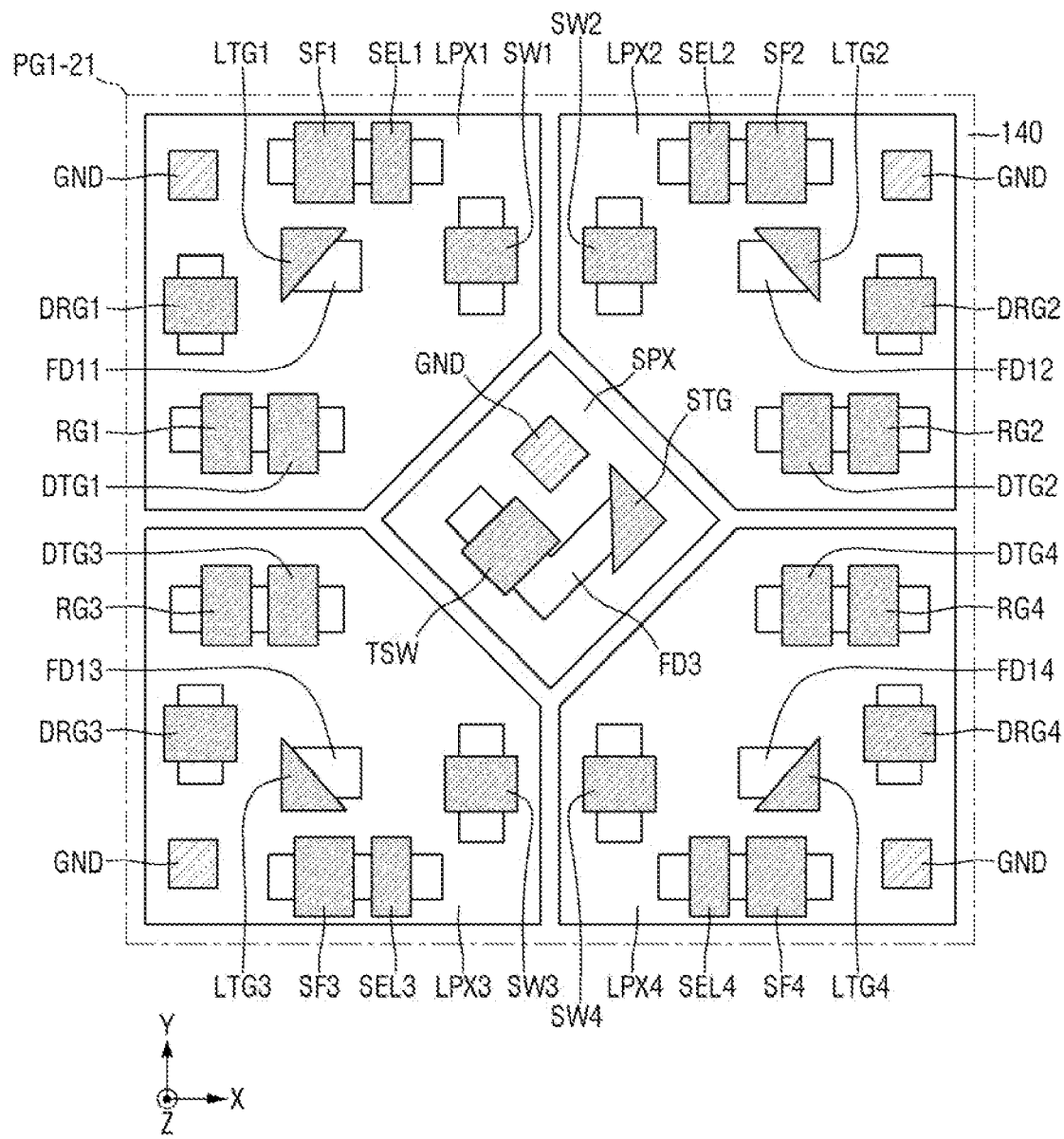
FIGS. 19 and 21 are example layout diagrams for explaining the first pixel group of FIG. 17.
Figure 20:
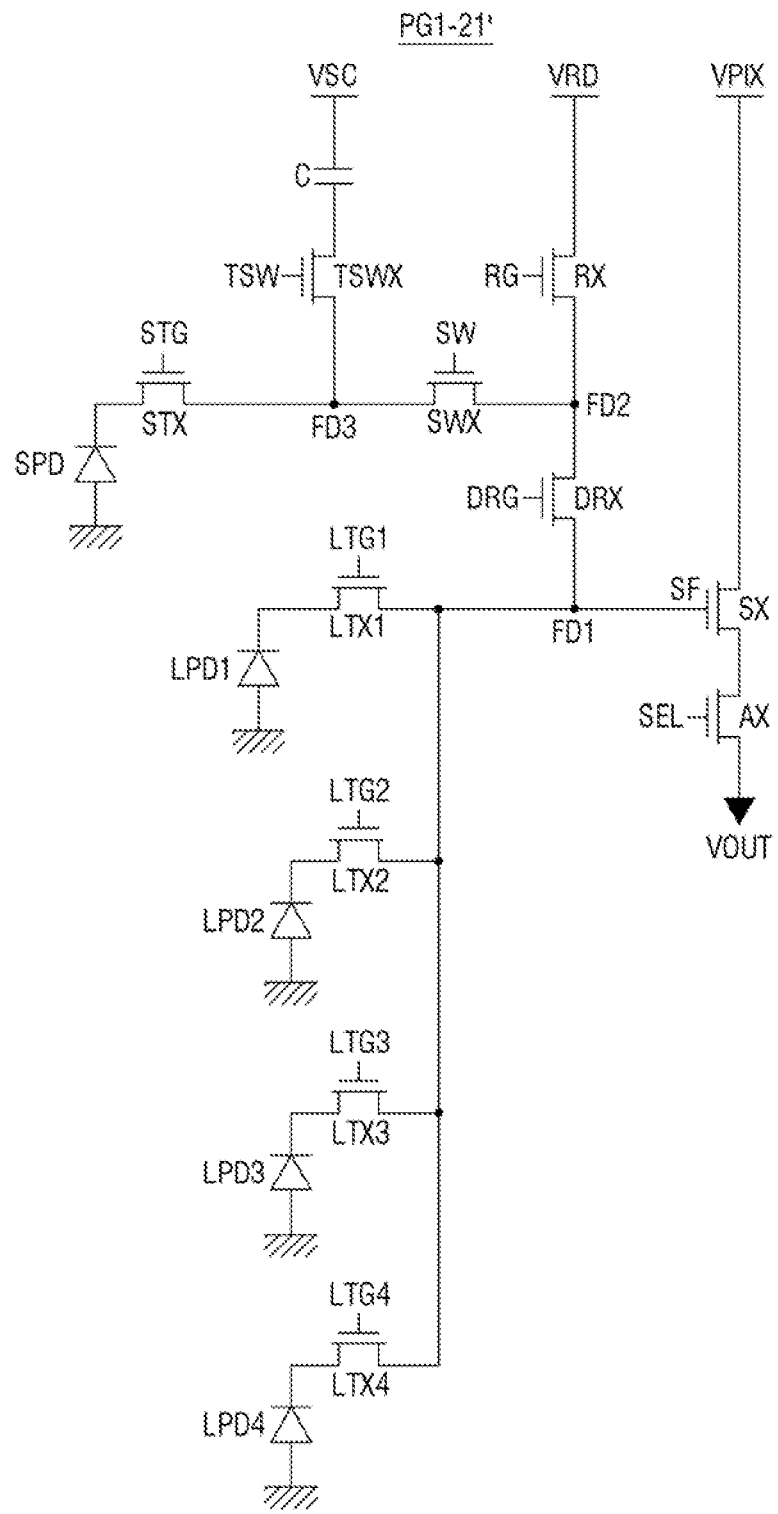
Figure 21:
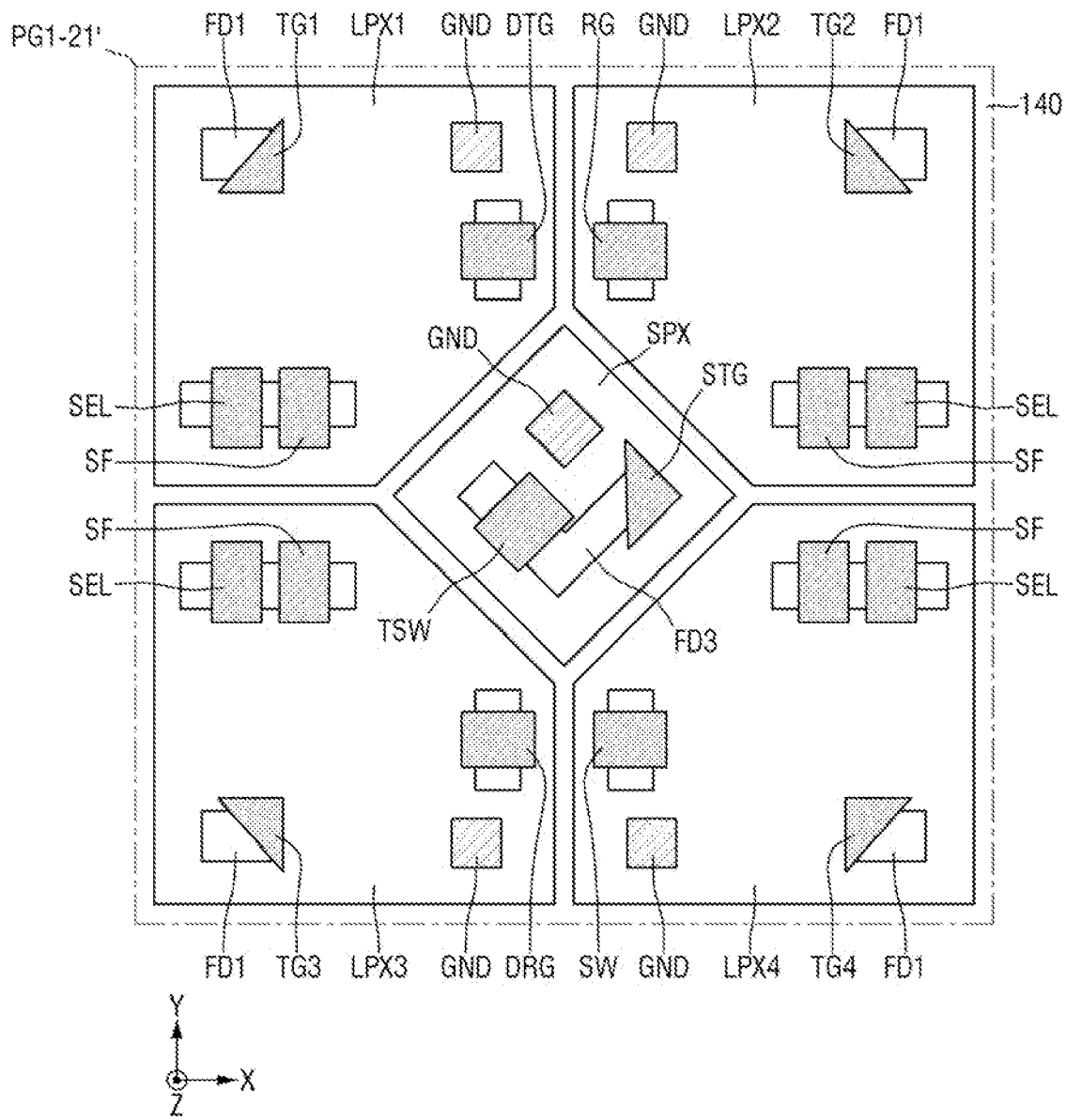

FIG. 17 is a diagram for explaining the first pixel group of FIG. 16. FIGS. 18 and 20 are example circuit diagrams for explaining the first pixel group of FIG. 17. FIGS. 19 and 21 are example layout diagrams for explaining the first pixel group of FIG. 17.

Referring to FIG. 17, in a first pixel group PG1-21 according to some example embodiments, the first region REG1 may include first pixels LPX1, LPX2, LPX3, and LPX4 arranged in m*n (m and n are natural numbers of 2 or more), and the second region REG2 may include one second pixel SPX. The first region REG may include, e.g., the first pixels LPX1, LPX2, LPX3, and LPX4 arranged in 2*2.

In plane view, the first region REG1 may surround the second region REG2. In plane view, the first pixel group PG1-21 may have a rectangular shape, and the second region REG2 may have a rhombic shape. In plane view, the second pixel SPX may have a rhombic shape.

In plane view, the area of the first region REG1 may be greater than the area of the second region REG2. In plane view, the total area of the first photodiodes included in the first region REG1 may be greater than the total area of the second photodiode included in the second region REG2.

Referring to FIGS. 17 to 19, in the first pixel group PG1-21 according to some example embodiments, the first-1 to first-4 pixels LPX1, LPX2, LPX3, and LPX4 may share the second pixel SPX. The first-1 to first-4 pixels LPX1, LPX2, LPX3, and LPX4 may each include first-1 to first-4 photodiodes LPD1, LPD2, LPD3, and LPD4, and first-1 to first-4 floating diffusion regions FD11, FD12, FD13, and FD14.

The first-1 pixel LPX1 may include the grounded region GND, the first-1 photodiode LPD1, a first-1 transfer transistor LTX1, a first source follower transistor SX1, a first selection transistor AX1, a first connecting transistor DRX1, a first reset transistor RX1, and a first switch transistor SWX1. The first-2 pixel LPX2 may include the grounded region GND, the first-2 photodiode LPD2, a first-2 transfer transistor LTX2, a second source follower transistor SX2, a second selection transistor AX2, a second connecting transistor DRX2, a second reset transistor RX2, and a second switch transistor SWX2. The first-3 pixel LPX3 may include the grounded region GND, the first-3 photodiode LPD3, a first-3 transfer transistor LTX3, a third source follower transistor SX3, a third selection transistor AX3, a third connecting transistor DRX3, a third reset transistor RX3, and a third switch transistor SWX3. The first-4 pixel LPX4 may include the grounded region GND, the first-4 photodiode LPD4, a first-4 transfer transistor LTX4, a fourth source follower transistor SX4, a fourth selection transistor AX4, a fourth connecting transistor DRX4, a fourth reset transistor RX4, and a fourth switch transistor SWX4. The second pixel SPX2 may include the grounded region GND, the second switch transistor TSWX, the second photodiode SPD, and the second transfer transistor STX.

The first connecting transistor DRX1 may connect the first-1 floating diffusion region FD11 and the third floating diffusion region FD3. The second connecting transistor DRX2 may connect the first-2 floating diffusion region FD12 and the third floating diffusion region FD3. The third connecting transistor DRX3 may connect the first-3 floating diffusion region FD13 and the third floating diffusion region FD3. The fourth connecting transistor DRX4 may connect the first-4 floating diffusion region FD14 and the third floating diffusion region FD3.

Each of the first-1 pixels to the first-4 pixels LPX1, LPX2, LPX3, and LPX4 may further include a dummy transistor. Referring to FIG. 19, the first-1 pixels to the first-4 pixels LPX1, LPX2, LPX3, and LPX4 may include the first to fourth dummy gates DTG1, DTG2, DTG3, and DTG4 of the first to fourth dummy transistors, respectively.

Referring to FIGS. 17, 20, and 21, in a first pixel group PG1-21' according to some example embodiments, the first-1 pixel to first-4 pixels LPX1, LPX2, LPX3, and LPX4 may share the first floating diffusion region FD1. The first-1 to first-4 transfer transistors LTX1, LTX2, LTX3, and LTX4 may each be connected to the first floating diffusion region FD1. The first-1 pixel to first-4 pixels LPX1, LPX2, LPX3, and LPX4 may share the first switch transistor SWX, the reset transistor RX, the connecting transistor DRX, the source follower transistor SX, and the selection transistor AX.

Also, the first-1 pixel LPX1 may include the dummy gate DTG (not shown in FIG. 20), the first-2 pixel LPX2 may include the reset gate RG, the first-3 pixel LPX3 may include the connecting gate DRG, and the first-4 pixel LPX4 may include the first switch gate SW.

Figure 22:
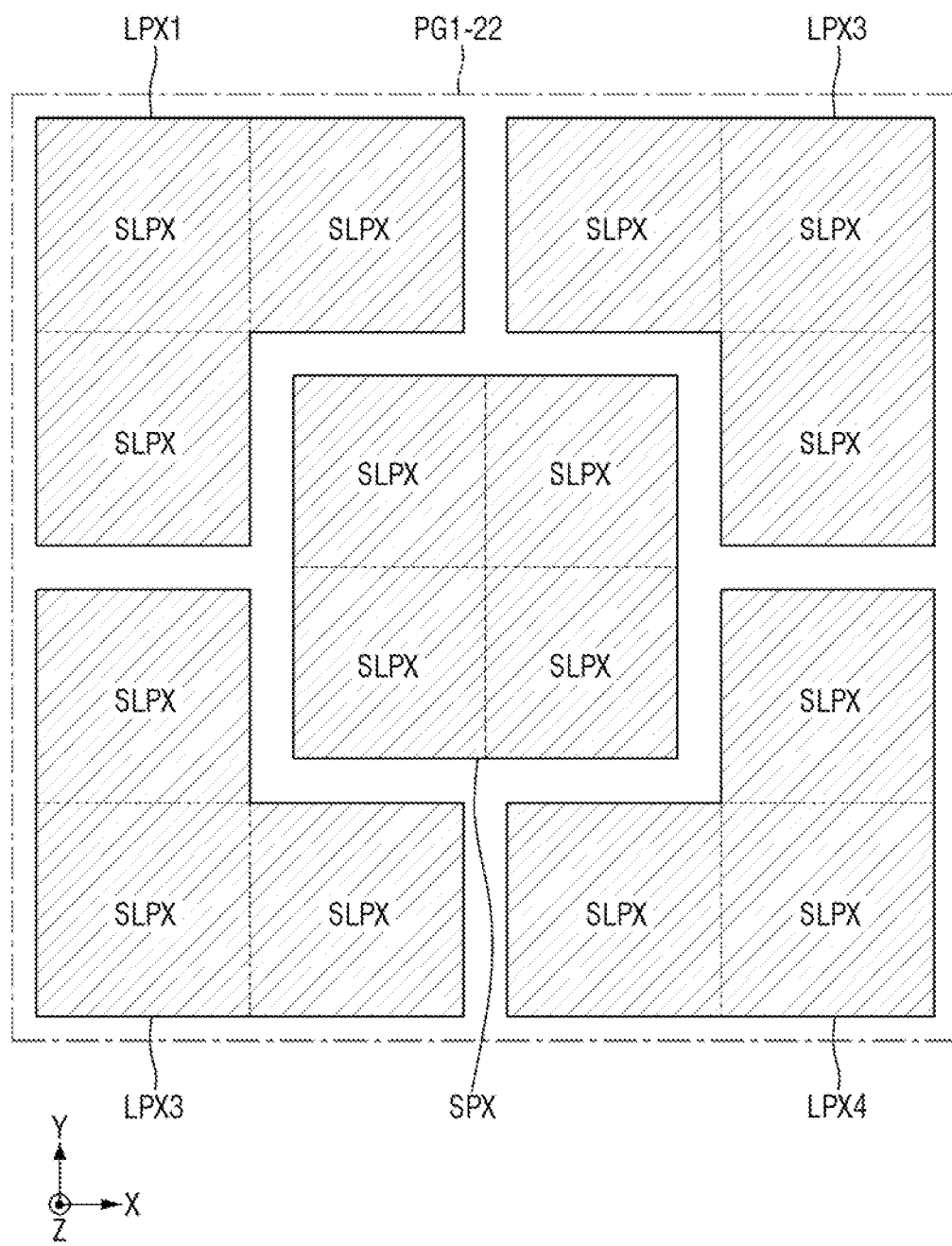
FIGS. 22 to 24 are diagrams for explaining the first pixel group of FIG. 16.
Figure 23:
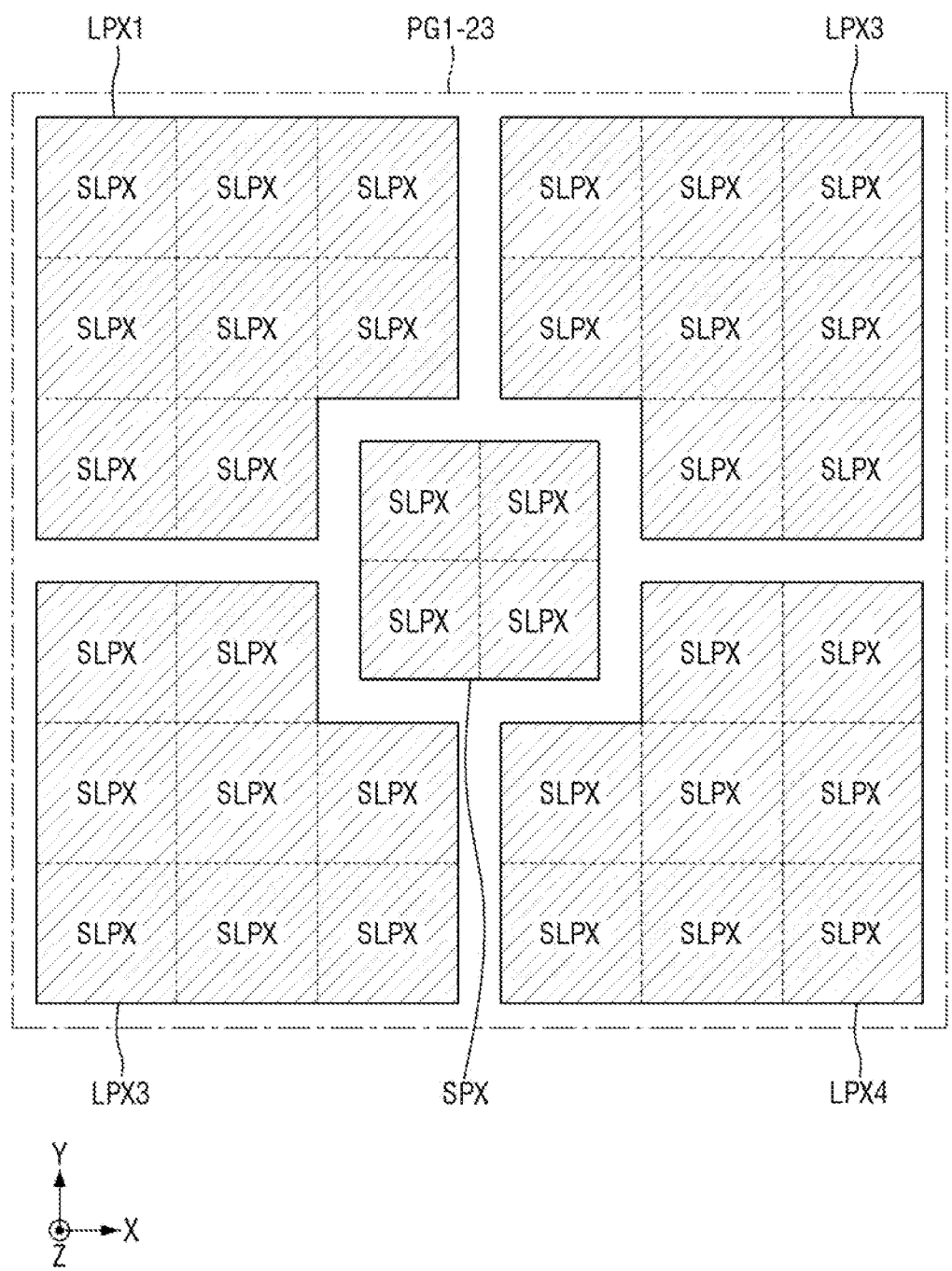
Figure 24:
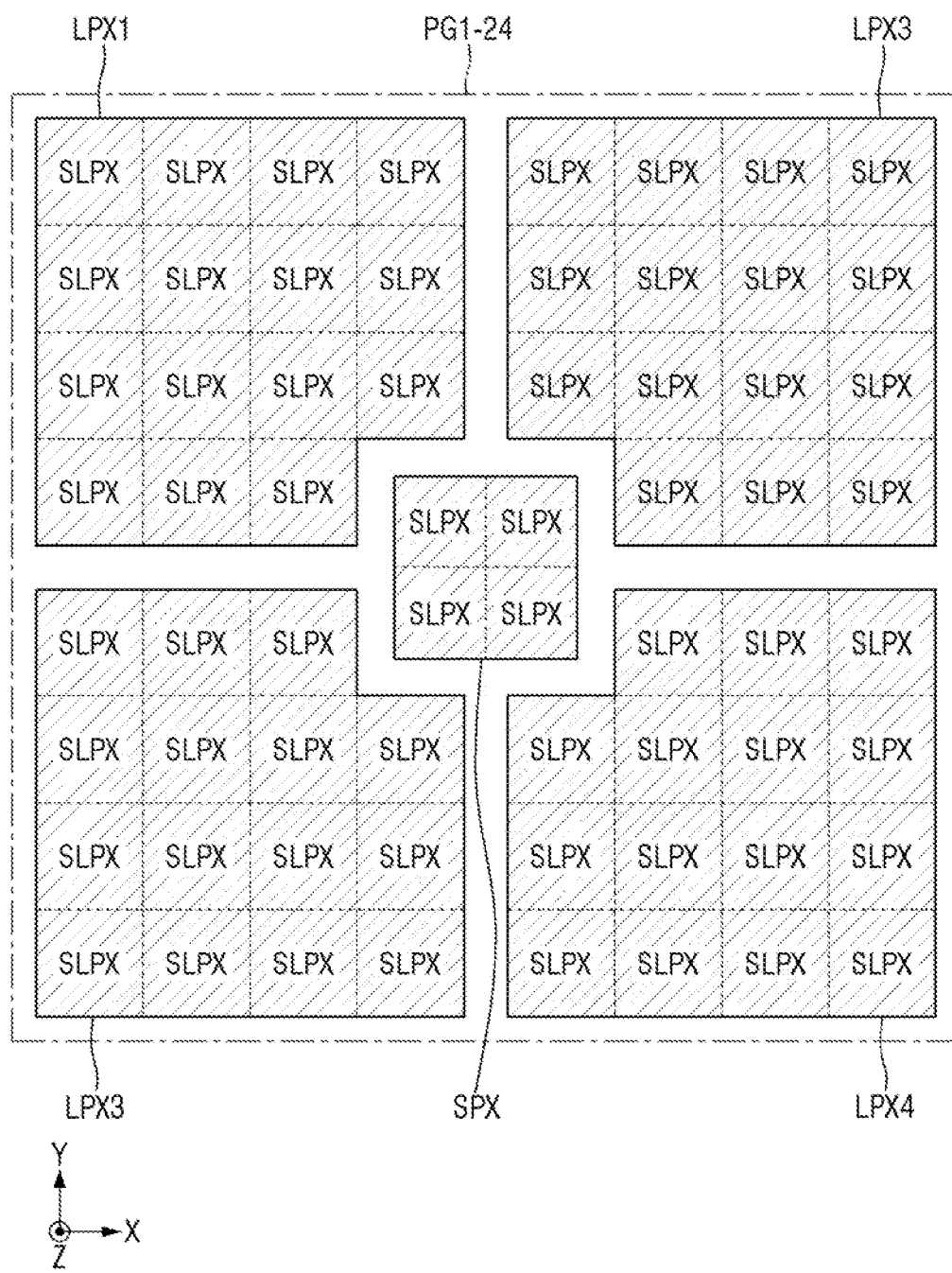

FIGS. 22 to 24 are diagrams for explaining the first pixel group of FIG. 16. For convenience of explanation, points different from those described using FIGS. 16 to 21 will be mainly described.

Referring to FIGS. 22 to 24, each of the first pixels LPX1, LPX2, LPX3, and LPX4 arranged in 2*2 may include a plurality of sub-pixels SLPX (see FIG. 13).

Referring to FIGS. 18 and 22 to 24, each sub-pixel SLPX may include, e.g., the first photodiode LPD1, the first-1 floating diffusion region FD11, and the first transfer transistor LTX1 between the first photodiode LPD1 and the first-1 floating diffusion region FD 11. In another implementation, referring to FIGS. 20 and 22 to 24, each sub-pixel SLPX may include, e.g., the first photodiode LPD1, the first floating diffusion region FD1, and the first transfer transistor LTX1 between the first photodiode LPD1 and the first floating diffusion region FD1.

Referring to FIG. 22, according to some example embodiments, each of the first pixels LPX1, LPX2, LPX3, and LPX4 in the first pixel groups PG1-22 may include three sub-pixels SLPX, and the second pixel SPX may include four sub-pixels SLPX, i.e., a part of the sub-pixels SLPX arranged in 2*2 may form a respective part of the second pixel SPX, and the rest may be the first pixel LPX1. Stated another way, the second pixel SPX may be formed from four sub-pixels SLPX adjacent to each other.

The second pixel SPX may include four second photodiodes SPD, and the first pixel LPX1 may include three first photodiodes LPD. That is, the second pixel SPX may include four first photodiodes LPD, and the first pixel LPX1 may include three first photodiodes LPD. The first photodiode LPD may be the same as the second photodiode SPD. In plane view, the area of one first photodiode SPD may be the same as the area of one second photodiode SPD.

The above description of FIG. 22 will now be applied to FIGS. 23 and 24.

Referring to FIG. 23, according to some example embodiments, each of the first pixels LPX1, LPX2, LPX3, and LPX4 in the first pixel group PG1-23 may include eight sub-pixels SLPX. The second pixel SPX may include four sub-pixels SLPX. The first photodiode LPD may be the same as the second photodiode SPD. In plane view, the area of one first photodiode SPD may be the same as the area of one second photodiode SPD.

For example, a part of the sub-pixels SLPX arranged in 3*3 may form a part of the second pixel SPX, and the rest may be the first pixel LPX1. The ratio of the sub-pixels SLPX provided as the second pixel SPX1 among the sub-pixels SLPX arranged in 3*3 may vary. The four sub-pixels SLPX adjacent to each other may be the second pixel SPX. The second pixel SPX may include four second photodiodes SPD, and the first pixel LPX1 may include eight first photodiodes LPD. That is, the second pixel SPX may include four first photodiodes LPD, and the first pixel LPX1 may include eight first photodiodes LPD. The ratio of the sub-pixel SLPX that is the second pixel SPX1 among the sub-pixels SLPX arranged in 3*3 may vary.

Referring to FIG. 24, according to some example embodiments, each of the first pixels LPX1, LPX2, LPX3, and LPX4 in the first pixel group PG1-24 may include fifteen sub-pixels SLPX. The second pixel SPX may include four sub-pixels SLPX. The first photodiode LPD may be the same as the second photodiode SPD. In plane view, the area of one first photodiode SPD may be the same as the area of one second photodiode SPD.

For example, a part of the sub-pixel SLPX arranged in 4*4 may form a part of the second pixel SPX, and the rest may be the first pixel LPX1. The ratio of the sub-pixel SLPX provided as the second pixel SPX1 among the sub-pixels SLPX arranged in 4*4 may vary. The four sub-pixels SLPX adjacent to each other may be the second pixel SPX. The second pixel SPX may include four second photodiodes SPD, and the first pixel LPX1 may include fifteen first photodiodes LPD. That is, the second pixel SPX may include four first photodiodes LPD, and the first pixel LPX1 may include fifteen first photodiodes LPD. The ratio of the second pixel SPX1 among the sub-pixels SLPX arranged in 4×4 may vary.

Figure 25:
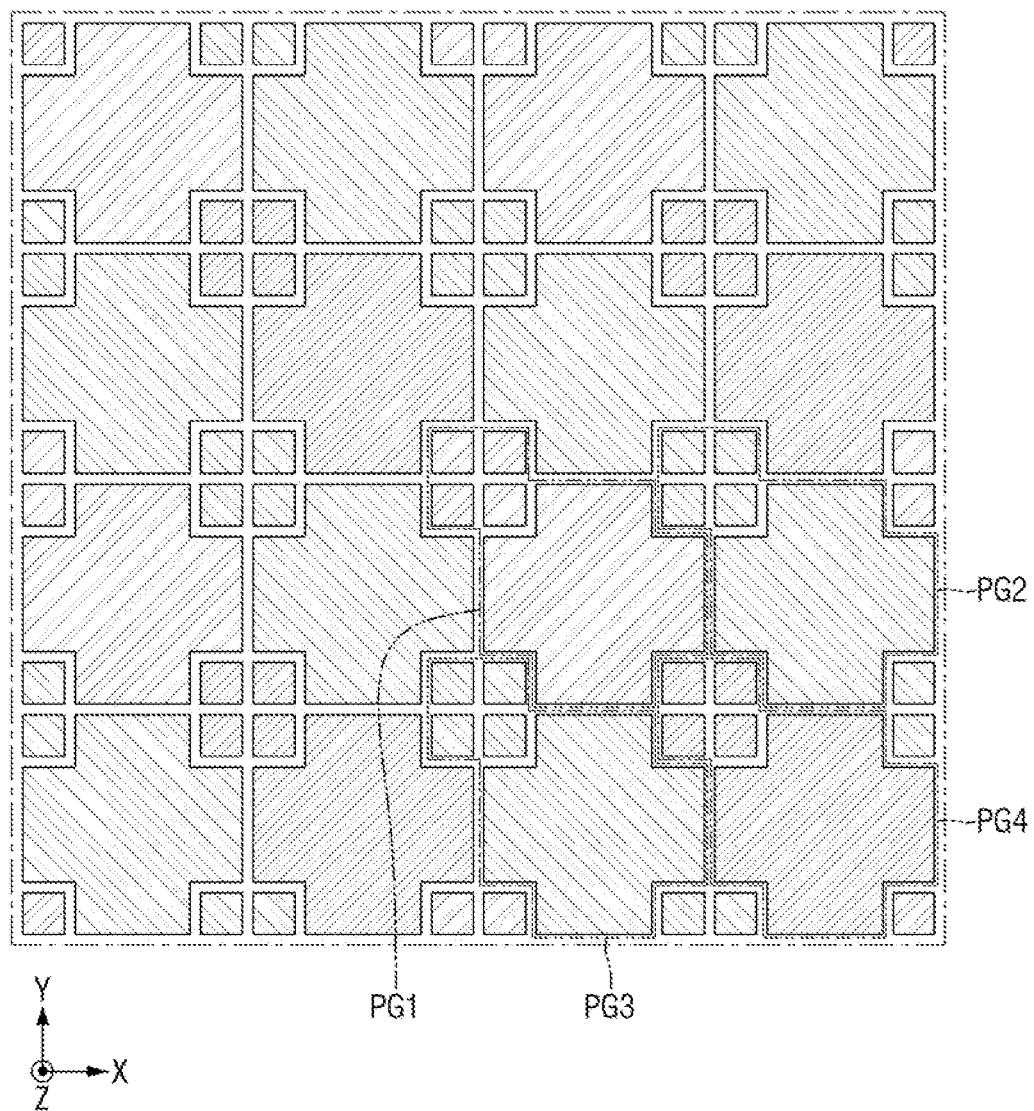
FIG. 25 is a diagram for explaining a pixel array according to some example embodiments.
Figure 26:
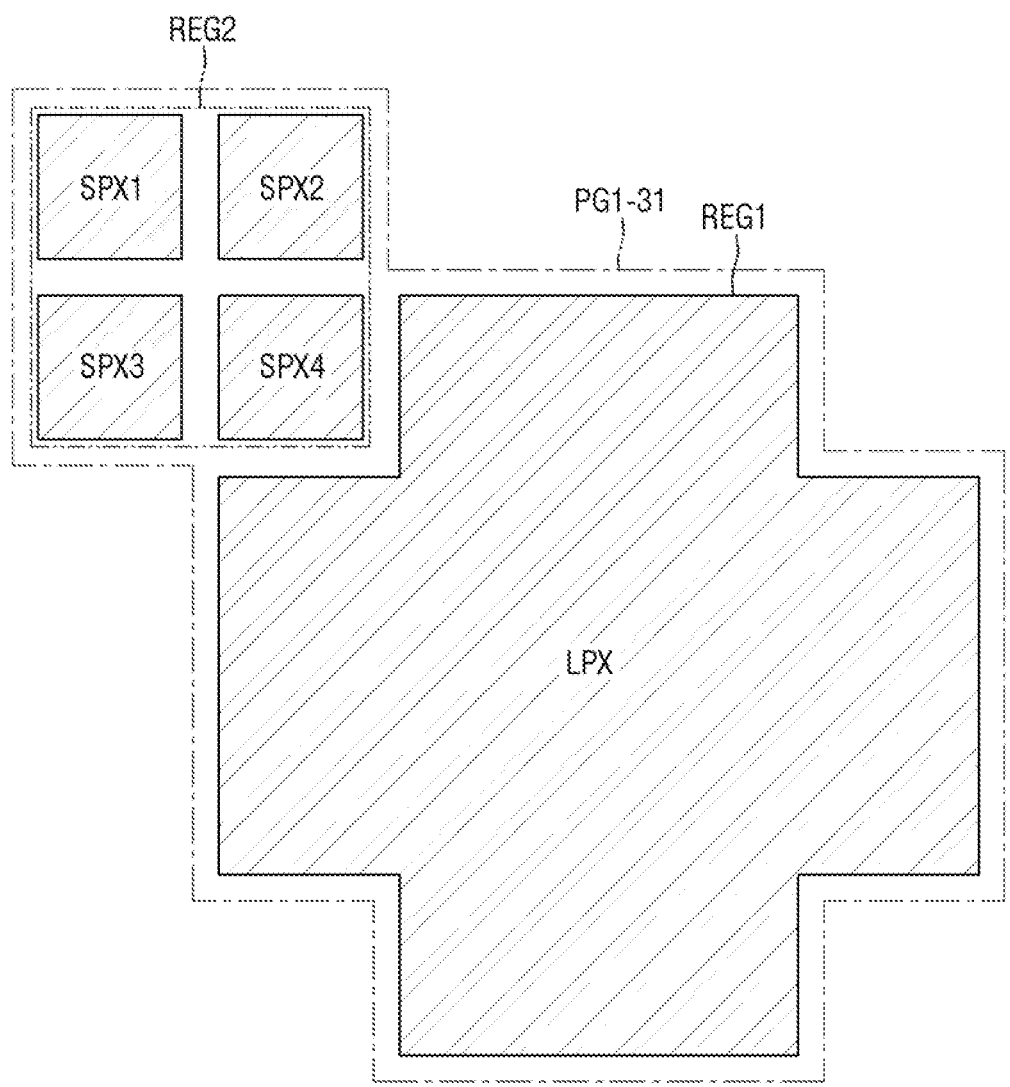
FIG. 26 is a diagram for explaining a first pixel group of FIG. 25.
Figure 27:
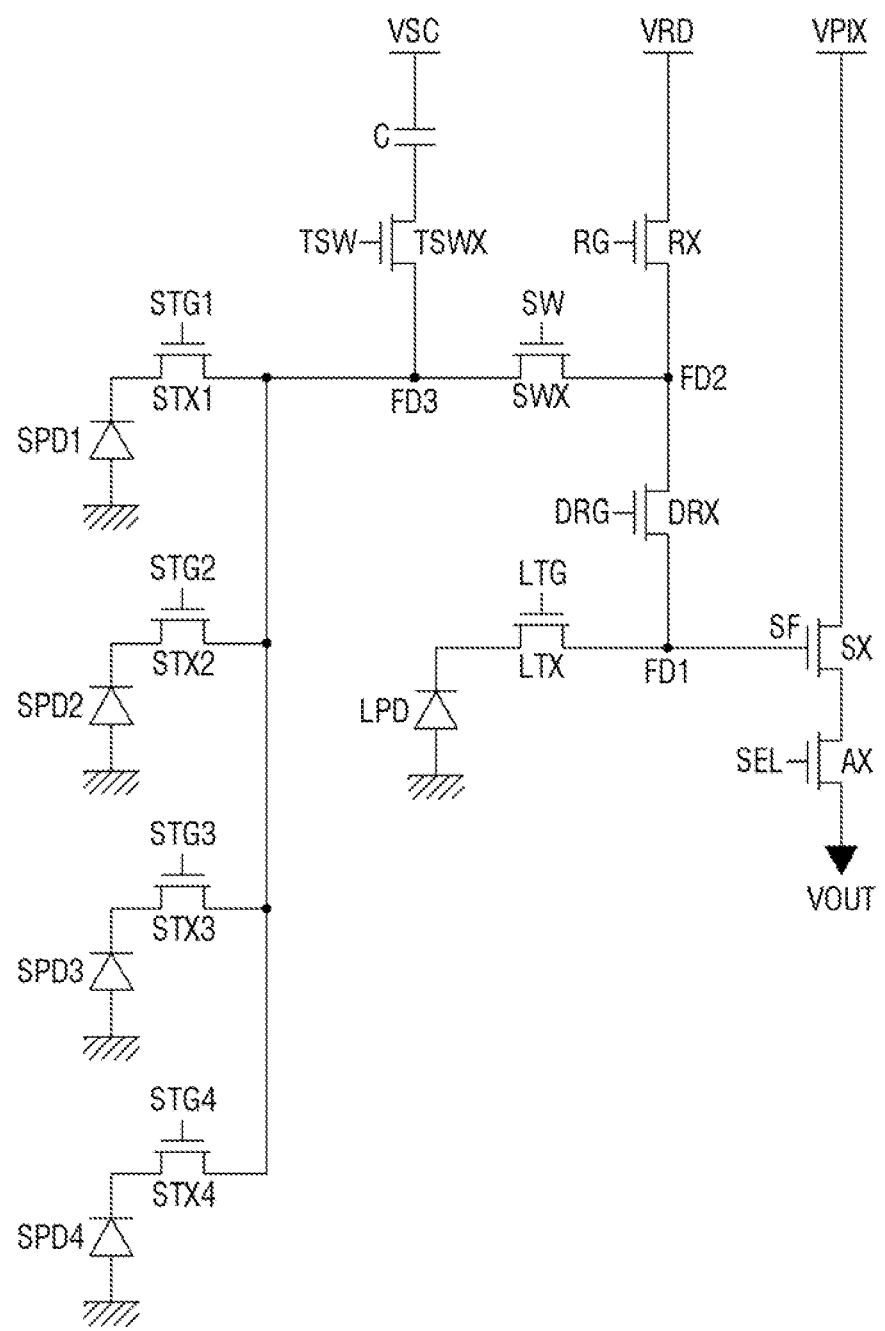
FIG. 27 is an example circuit diagram for explaining the first pixel group of FIG. 26.
Figure 28:
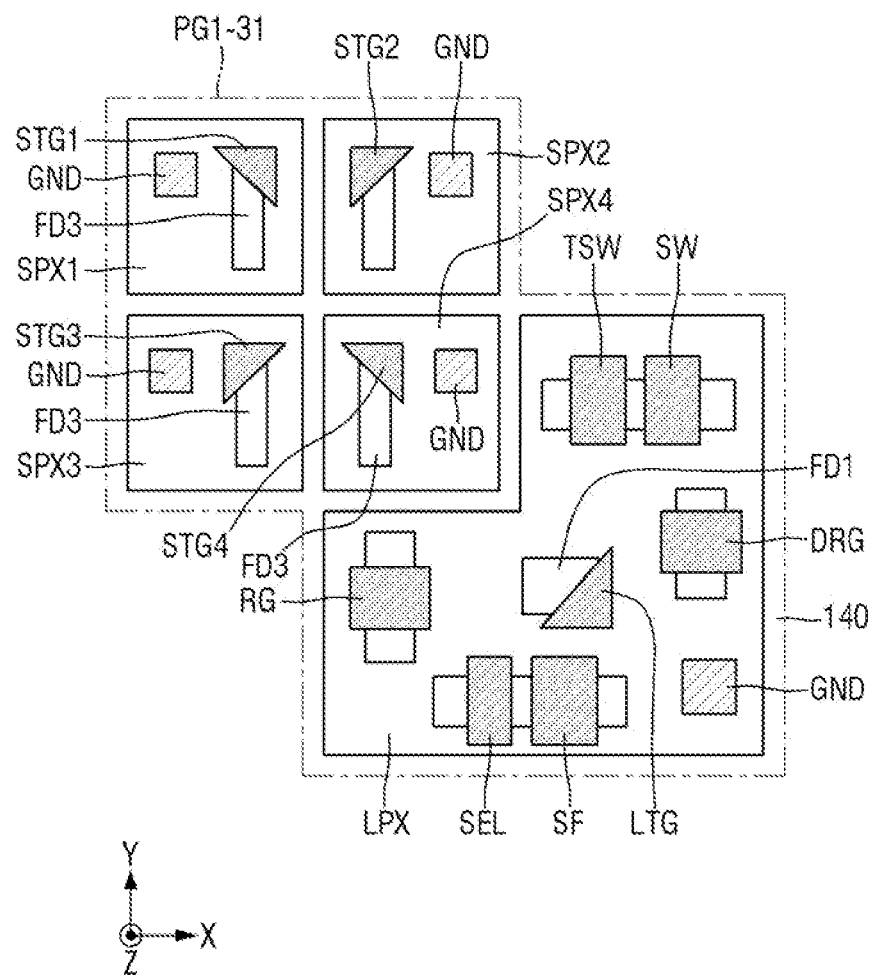
FIG. 28 is an example layout diagram for explaining the first pixel group of FIG. 26.

FIG. 25 is a diagram for explaining the pixel array according to some example embodiments. FIG. 26 is a diagram for explaining the first pixel group of FIG. 25. FIG. 27 is an example circuit diagram for explaining the first pixel group of FIG. 26. FIG. 28 is an example layout diagram for explaining the first pixel group of FIG. 26. For convenience of explanation, points different from those described using FIGS. 1 to 15 will be mainly described.

Referring to FIG. 25, according to some example embodiments, a pixel array PA-3 may include a plurality of pixel groups PG1, PG2, PG3, and PG4. A color filter having the same color may be disposed on each of the pixel groups PG1, PG2, PG3, and PG4.

Referring to FIG. 26, in a first pixel group PG1-31, the first region REG1 may include one first pixel LPX, and the second region REG2 may include second pixels SPX1, SPX2, SPX3, and SPX4 arranged in m*n (m and n are natural numbers of 2 or more). The second region REG2 may include, e.g., the second pixels SPX1, SPX2, SPX3, and SPX4 arranged in 2*2.

In plane view, the second region REG2 may be disposed on one side of the first region REG1. In plane view, the first region REG1 may have a cross shape, and the second region REG2 may have a rectangular shape. In plane view, the first region REG1 may include a central portion having a rectangular shape, a first portion protruding from the central portion in the first direction X, and a second portion protruding from the central portion in the second direction Y. In plane view, the second region REG2 may be disposed in either the first portion or the second portion.

In plane view, the area of the first region REG1 may be greater than the area of the second region REG2. In plane view, the total area of the first photodiode included in the first region REG1 may be greater than the total area of the second photodiodes included in the second region REG. In plane view, the area of the first photodiode LPD may be greater than the area of the second photodiode SPD.

Referring to FIGS. 26 to 28, in the first pixel group PG1-31, second-1 to second-4 pixels SPX1, SPX2, SPX3, and SPX4 may share the first pixel LPX. The second-1 to second-4 pixels SPX1, SPX2, SPX3, and SPX4 may include second-1 to second-4 photodiodes SPD1, SPD2, SPD3, and SPD4, respectively. The second-1 to second-4 pixels SPX1, SPX2, SPX3, and SPX4 may share the third floating diffusion region FD3. Second-1 to second-4 transfer transistors STX1, STX2, STX3, and STX4 may be connected to the third floating diffusion region FD3. At least two of the second pixels SPX, e.g., the second-1 to second-4 pixels SPX1, SPX2, SPX3, and SPX4, may share the connecting transistor DRX.

For example, the first pixel LPX may include the grounded region GND, the first photodiode LPD, the first transfer transistor LTX, the source follower transistor SX, the selection transistor AX, the connecting transistor DRX, the reset transistor RX, the first switch transistor SWX, and the second switch transistor TSWX. The second pixel SPX2 may include the grounded region GND, the second photodiode SPD, and the second transfer transistor STX.

Figure 29:
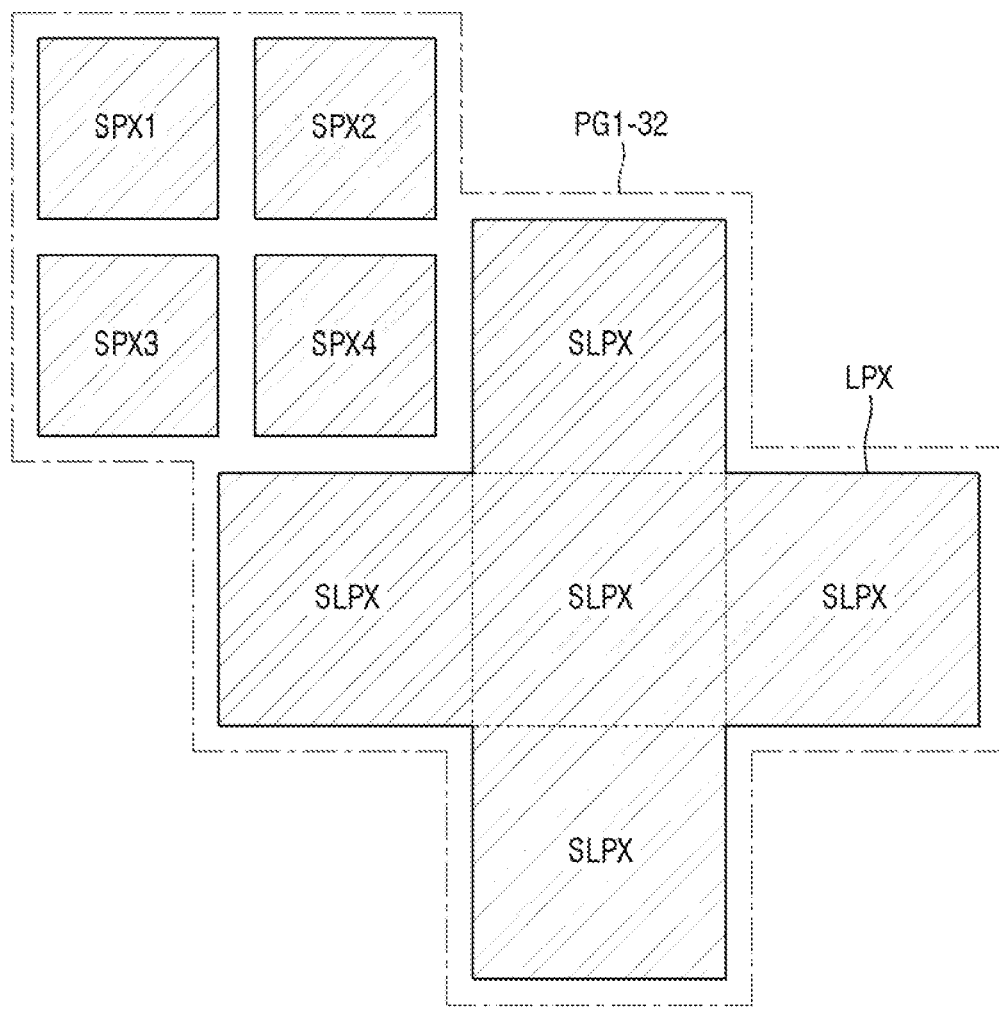
FIGS. 29 and 30 are for explaining a first pixel group of FIG. 25 according to some example embodiments.
Figure 30:
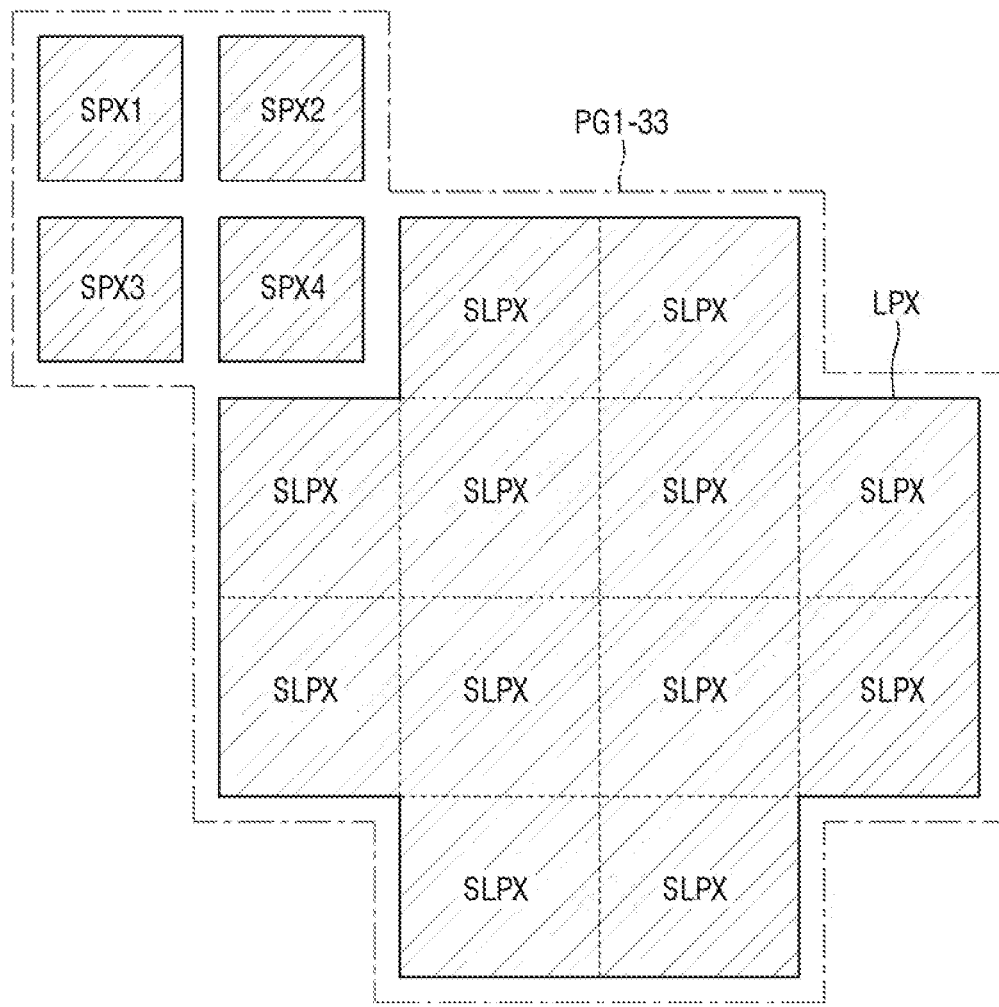

FIGS. 29 and 30 are diagrams for explaining a first pixel group of FIG. 25 according to some example embodiments. For convenience of explanation, points different from those described using FIGS. 25 to 28 will be mainly described.

Referring to FIGS. 29 and 30, according to some example embodiments, the first pixel LPX may include a plurality of sub-pixels SLPX (see FIG. 13).

Referring to FIGS. 27, 29 and 30, each sub-pixel SLPX may include, e.g., the first photodiode LPD, the first floating diffusion region FD1, and the first transfer transistor LTX1 between the first photodiode LPD and the first floating diffusion region FD1.

Referring to FIG. 29, according to some example embodiments, in a first pixel group PG1-32, the first pixel LPX may include five sub-pixels SLPX. The sub-pixels SLPX may be the same as each of the second pixels SPX1, SPX2, SPX3, and SPX4. That is, the first photodiode LPD may be the same as the second photodiode SPD. In plane view, the area of one first photodiode SPD may be the same as the area of one second photodiode SPD.

For example, a part of the sub-pixels SLPX arranged in 3*3 may form a part of the second pixels SPX1, SPX2, SPX3, and SPX4, and the rest may be the first pixel LPX. The four sub-pixels SLPX adjacent to each other may be the second pixels SPX1, SPX2, SPX3, and SPX4. The second pixel SPX1, SPX2, SPX3, and SPX4 may include four second photodiodes SPD, and the first pixel LPX may include five first photodiodes LPD. That is, the second pixels SPX1, SPX2, SPX3, and SPX4 may include four first photodiodes LPD, and the first pixel LPX may include five first photodiodes LPD. The ratio of the sub-pixel SLPX that is the second pixel SPX1 among the sub-pixels SLPX arranged in 3*3 may vary.

Referring to FIG. 30, according to some example embodiments, in a first pixel group PG1-32, the first pixel LPX may include twelve sub-pixels SLPX. The sub-pixel SLPX may be the same as each of the second pixels SPX1, SPX2, SPX3, and SPX4. That is, the first photodiode LPD may be the same as the second photodiode SPD. In plane view, the area of one first photodiode SPD may be the same as the area of one second photodiode SPD.

For example, a part of the sub-pixels SLPX arranged in 4*4 may form a part of the second pixels SPX1, SPX2, SPX3, and SPX4, and the rest may be the first pixel LPX. The four sub-pixels SLPX adjacent to each other may be the second pixels SPX1, SPX2, SPX3, and SPX4. The second pixels SPX1, SPX2, SPX3, and SPX4 may include four second photodiodes SPD, and the first pixel LPX may include twelve first photodiodes LPD. That is, the second pixels SPX1, SPX2, SPX3, and SPX4 may include four first photodiodes LPD, and the first pixel LPX may include twelve first photodiodes LPD. The ratio of the sub-pixel SLPX that is the second pixel SPX1 among the sub-pixel SLPX arranged in 4*4 may vary.

Figure 31:
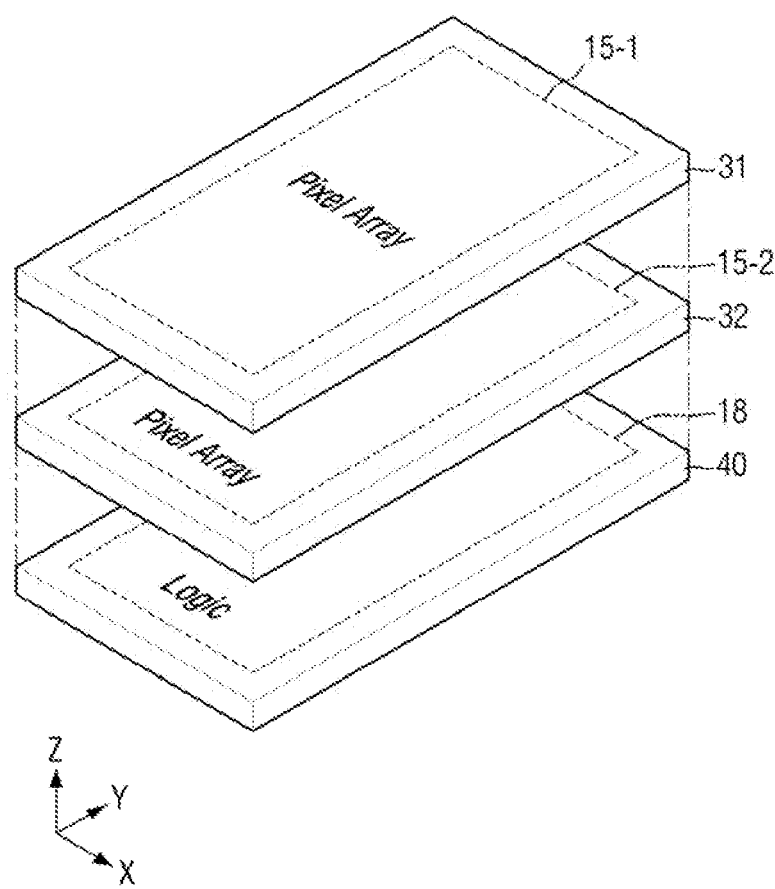
FIGS. 31 and 32 are diagrams for explaining a conceptual layout of the image sensor according to some example embodiments.
Figure 32:
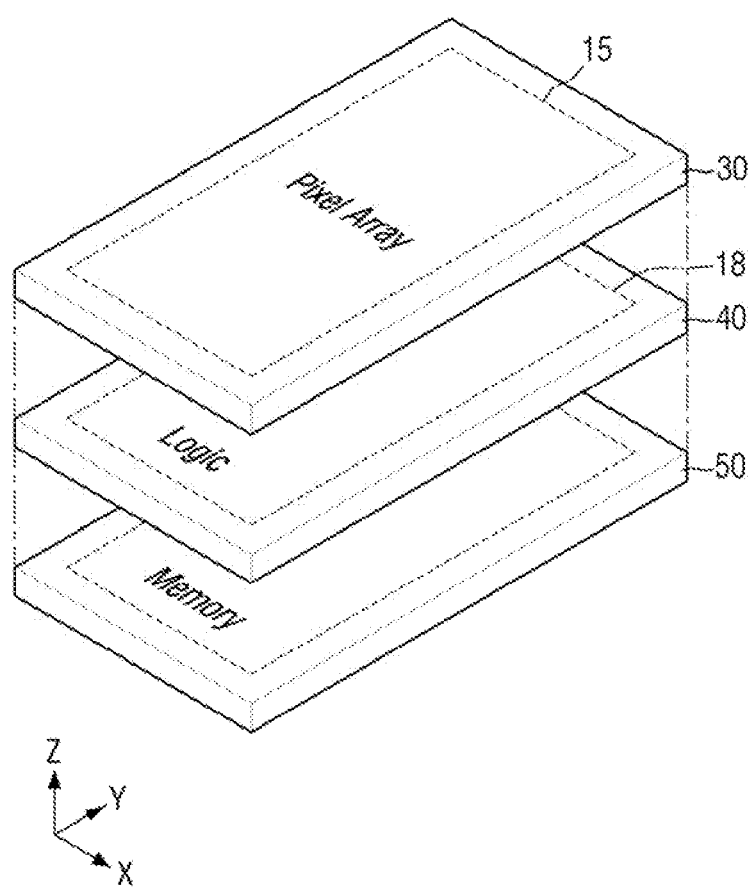

FIGS. 31 and 32 are diagrams showing a conceptual layout of an image sensor according to some example embodiments. Points different from those described with reference FIG. 2 will be mainly described.

Referring to FIG. 31, according to some example embodiments, an image sensor 10-2 may include a first-1 layer 31, a first-2 layer 32, and a second layer 40. The first-1 layer 31 may include a first pixel array 15-1, and the first-2 layer 32 may include a second pixel array 15-2. The first pixel array 15-1 may be a part of the pixel array 15 of FIG. 1, and the second pixel array 15-2 may be the rest of the pixel array 15 of FIG. 1.

The first pixel array 15-1 may include a photodiode and a transfer transistor, and the second pixel array 15-2 may include transistors other than the photodiode and the transfer transistor.

For example, referring to FIG. 5, the first photodiode SPD, the second photodiode LPD, the first transfer transistor STX, and the second transfer transistor LTX may be disposed in the first pixel array 15-1. The first switch transistor SWX, the second switch transistor TSWX, the reset transistor RX, the connecting transistor DRX, the source follower transistor SX, and the selection transistor AX may be disposed in the second pixel array 15-2. For example, referring to FIGS. 18 and 20, the first-1 to first-4 photodiodes LPD1, LPD2, LPD3, and LPD4, the second photodiode SPD, the first-1 to first-4 transfer transistors LTX1, LTX2, LTX3, and LTX4, and the second transfer transistor STX may be disposed in the first pixel array 15-1, and the remaining transistors may be disposed in the second pixel array 15-2. Referring to FIG. 27, the first photodiode LPD, the second-1 to second-4 photodiodes SPD1, SPD2, SPD3, and SPD4, the first transfer transistor LTX, and the second-1 to the second-4 transfer transistors STX1, STX2, STX3, and STX4 may be disposed in the first pixel array 15-1, and the remaining transistors may be disposed in the second pixel array 15-2.

Referring to FIG. 32, an image sensor 10-3 according to some example embodiments may include a first layer 30, a second layer 40, and a third layer 50. The first layer 30 may be disposed over the second layer 40, and the second layer 40 may be disposed over the third layer 50.

The third layer 50 may include a memory device. For example, the third layer 50 may include a volatile memory device such as a DRAM or SRAM. The third layer 50 may receive signals from the first layer 30 and the second layer 40, and process the signals through the memory device. That is, the image sensor 10-3 may be a three-stack image sensor including three layers, i.e., the first layer 30, the second layer 40, and the third layer 50.

Figure 33:
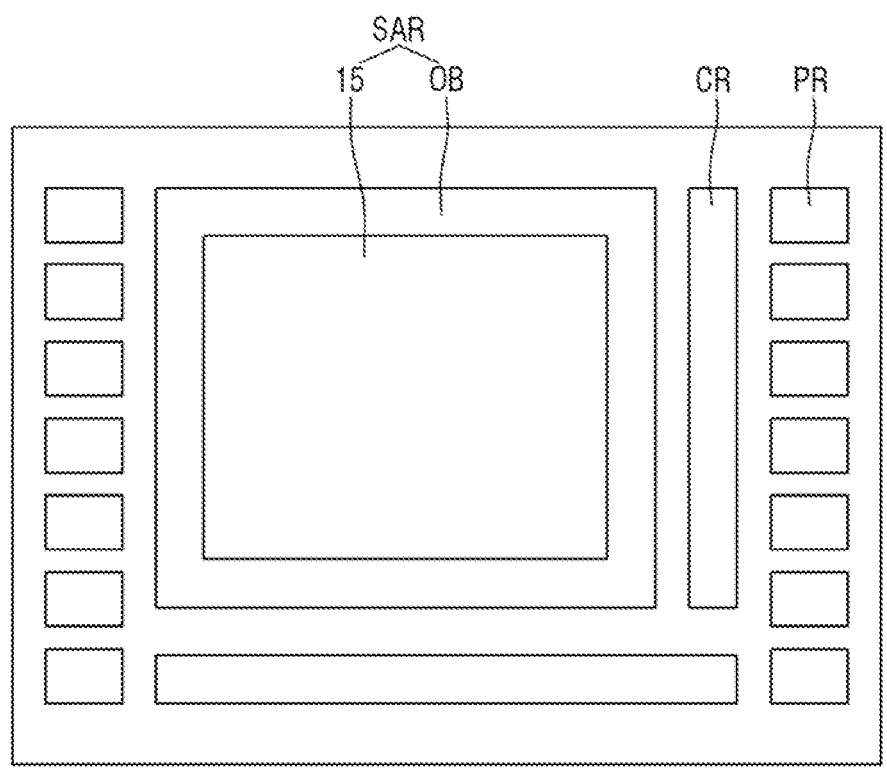
FIG. 33 is an example layout diagram for explaining an image sensor according to some example embodiments.
Figure 34:
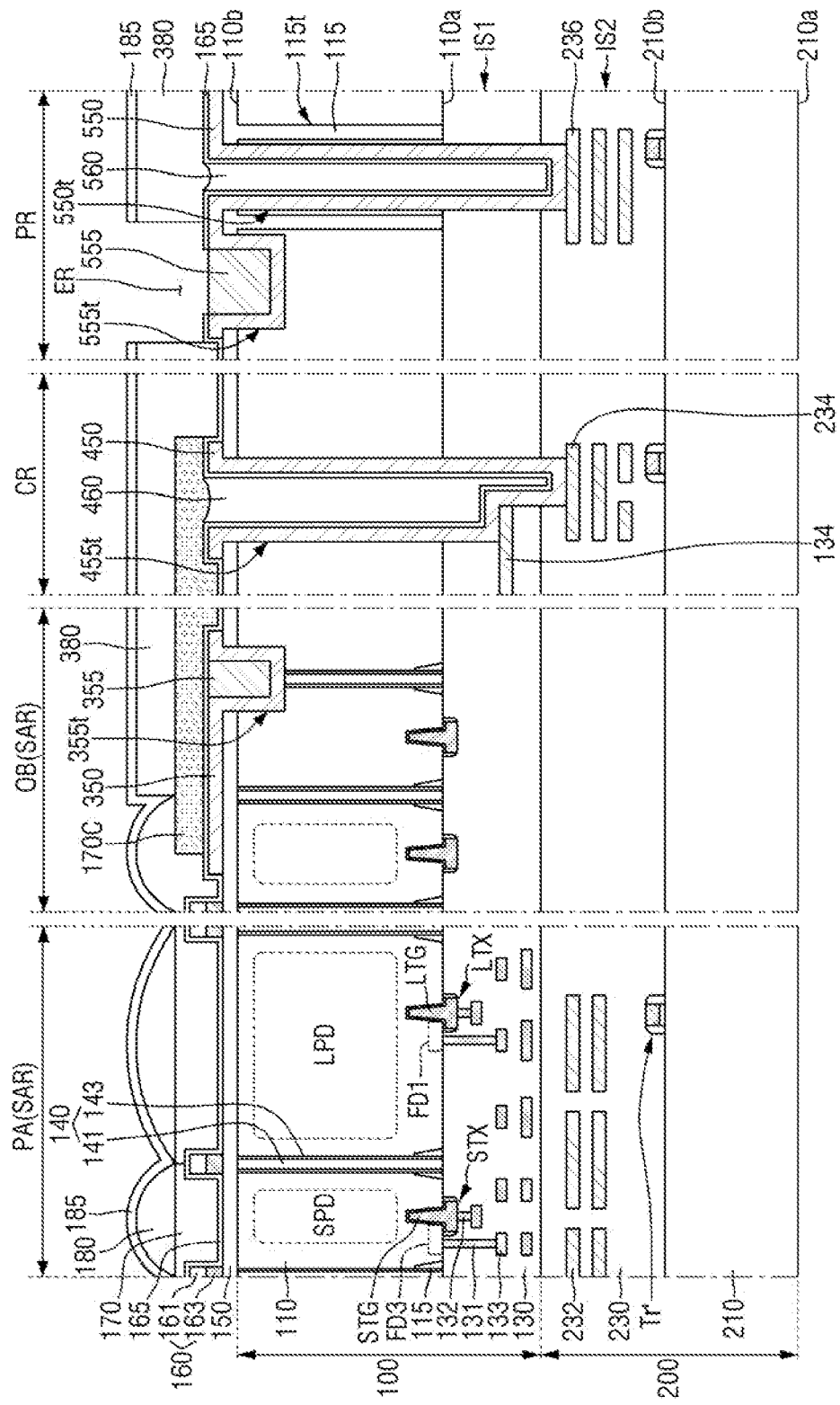
FIG. 34 is a schematic cross-sectional view for explaining an image sensor according to some example embodiments.

FIG. 33 is an example layout diagram for explaining an image sensor according to some example embodiments. FIG. 34 is the schematic cross-sectional view for explaining the image sensor according to some example embodiments. For convenience of explanation, points different from those described using FIGS. 1 to 30 will be mainly described. In FIG. 34, the cross-sectional view of FIG. 7 is shown as an example cross-sectional view of the sensor array region SAR.

Referring to FIGS. 33 and 34, the image sensor according to some example embodiments may include a sensor array region SAR, a connecting region CR, and a pad region PR.

The sensor array region SAR may include a region corresponding to the pixel array 15 of FIG. 1. The sensor array region SAR may include the pixel array 15 and a light-shielding region OB. Active pixels that receive light and generate an active signal may be arranged in the pixel array 15. Optically black pixels that block light and generate an optically black signal may be disposed in the light-shielding region OB. The light-shielding region OB may be formed, e.g., along the periphery of the pixel array 15. Dummy pixels (not shown) may be formed in the pixel array 15 adjacent to the light-shielding region OB.

The connecting region CR may be formed around the sensor array region SAR. The connecting region CR may be formed on one side of the sensor array region SAR. Wirings formed in the connecting region CR may be configured to transmit and receive electrical signals of the sensor array region SAR.

The pad region PR may be formed around the sensor array region SAR. The pad region PR may be formed to be adjacent to the edge of the image sensor. The pad region PR may be connected to an external device or the like, and configured to transmit and receive electrical signals between the image sensor and the external device.

In FIG. 33, although the connecting region CR is shown to be interposed between the sensor array region SAR and the pad region PR, this is merely an example and the arrangement of the sensor array region SAR, the connecting region CR, and the pad region PR may be changed as needed.

Referring to FIG. 34, the first substrate 110 and the first wiring structure IS1 may form the first substrate structure 100. The first wiring structure IS1 may include a first wiring 133 in the sensor array region SAR and a second wiring 134 in the connecting region CR. At least a part of the second wiring 134 may extend from the sensor array region SAR. For example, at least a part of the second wiring 134 may be electrically connected to at least a part of the first wiring 133.

The image sensor may include a second substrate 210 and a second wiring structure IS2.

The second substrate 210 may be bulk silicon or silicon on insulator (SOI). The second substrate 210 may be a silicon substrate, or may include other materials, e.g., silicon germanium, indium antimonide, lead tellurium compounds, indium arsenic, indium phosphide, gallium arsenide, or gallium antimonide. In an implementation, the second substrate 210 may have an epitaxial layer formed on the base substrate.

The second substrate 210 may include a third side 210a and a fourth side 210b that are opposite to each other. The fourth side 210b of the second substrate 210 may be a side that faces the first side 110a of the first substrate 110.

A plurality of electronic elements may be formed on the second substrate 210. For example, a transistor Tr' may be formed on the fourth side 210b of the second substrate 210. The transistor Tr' may be electrically connected to the sensor array region SAR, and may transmit and receive electrical signals to and from the sensor array region SAR. For example, the transistor Tr' may form part of electronic elements that constitute the control register block 11, the timing generator 12, the ramp signal generator 13, the row driver 14, the readout circuit 16, and the like of FIG. 1.

The second wiring structure IS2 may be formed on the second substrate 210. The second wiring structure IS2 may be formed on the fourth side 210b of the second substrate 210. The second substrate 210 and the second wiring structure IS2 may form a second substrate structure 200. The second wiring structure IS2 may be attached to the first wiring structure IS1. For example, as shown in FIG. 34, the upper surface of the second wiring structure IS2 may be attached to the lower surface of the first wiring structure IS1.

The second wiring structure IS2 may be made up of one wiring or a plurality of wirings. For example, the second wiring structure IS2 may include a second wiring insulation film 230, and plurality of wirings 232, 234, and 236 inside the second wiring insulation film 230. In FIG. 34, the number of layers of wiring constituting the second wiring structure IS2 and the arrangement thereof are merely example.

At least a part of the wirings 232, 234, and 236 of the second wiring structure IS2 may be connected to the transistor Tr'. The second wiring structure IS2 may include a third wiring 232 in the sensor array region SAR, a fourth wiring 234 in the connecting region CR, and a fifth wiring 236 in the pad region PR. The fourth wiring 234 may be the uppermost wiring of the plurality of wirings in the connecting region CR, and the fifth wiring 236 may be the uppermost wiring of the plurality of wirings in the pad region PR.

The image sensor may include a first connecting structure 350, a second connecting structure 450, and a third connecting structure 550.

The first connecting structure 350 may be formed inside the light-shielding region OB. The first connecting structure 350 may be formed on the surface insulating film 150 of the light-shielding region OB. The first connecting structure 350 may be in contact with the pixel separation pattern 140. For example, a first trench 355t that exposes the pixel separation pattern 140 may be formed inside the first substrate 110 and the surface insulating film 150 of the light-shielding region OB, and the first connecting structure 350 may be formed in the first trench 355t to be in contact with the pixel separation pattern 140 inside the light-shielding region OB. The first connecting structure 350 may extend along profiles of the side surfaces and the lower surface of the first trench 355t.

The first connecting structure 350 may be electrically connected to the pixel separation pattern 140 to apply a ground voltage or a negative voltage to the pixel separation pattern 140.

The first connecting structure 350 may include, e.g. at least one of titanium (Ti), titanium nitride (TiN), tantalum (Ta), tantalum nitride (TaN), tungsten (W), aluminum (Al), copper (Cu) and a combination thereof.

A first pad 355 that fills the first trench 355t may be formed on the first connecting structure 350. The first pad 355 may include, e.g. at least one of tungsten (W), copper (Cu), aluminum (Al), gold (Au), silver (Ag), and alloys thereof.

The first protective film 165 may cover the first connecting structure 350 and the first pad 355. For example, the first protective film 165 may extend along the profiles of the first connecting structure 350 and the first pad 355.

The second connecting structure 450 may be formed inside the connecting region CR. The second connecting structure 450 may be formed on the surface insulating film 150 of the connecting region CR. The second connecting structure 450 may electrically connect the first substrate structure 100 and the second substrate structure 200. For example, a second trench 455t that exposes the second wiring 134 and the fourth wiring 234 may be formed inside the first substrate structure 100 and the second substrate structure 200 of the connecting region CR, and the second connecting structure 450 may be formed inside the second trench 455t to connect the second wiring 134 and the fourth wiring 234. The second connecting structure 450 may extend along profiles of the side surfaces and the lower surface of the second trench 455t.

The second connecting structure 450 may include, e.g. at least one of titanium (Ti), titanium nitride (TiN), tantalum (Ta), tantalum nitride (TaN), tungsten (W), aluminum (Al), copper (Cu) and a combination thereof. The second connecting structure 450 may be formed at the same level as the first connecting structure 350.

The first protective film 165 may cover the second connecting structure 450. For example, the first protective film 165 may extend along the profile of the second connecting structure 450.

A first filling insulation film 460 that fills the second trench 455t may be formed on the second connecting structure 450. The first filling insulation film 460 may include, e.g. at least one of silicon oxide, aluminum oxide, tantalum oxide, and a combination thereof.

A third connecting structure 550 may be formed inside the pad region PR. The third connecting structure 550 may be formed on the surface insulating film 150 of the pad region PR. The third connecting structure 550 may electrically connect the second substrate structure 200 to an external device or the like. For example, a third trench 550t that exposes the fifth wiring 236 may be formed inside the first substrate structure 100 and the second substrate structure 200 of the pad region PR, and the third connecting structure 550 may be formed inside the third trench 550t to contact with the fifth wiring 236. Further, a fourth trench 555t may be formed inside the first substrate 110 of the pad region PR, and the third connecting structure 550 may be formed inside the fourth trench 555t and exposed. The third connecting structure 550 may extend along the profiles of side surfaces and lower surface of the third trench 550t and the fourth trench 555t.

The third connecting structure 550 may include, e.g. at least one of titanium (Ti), titanium nitride (TiN), tantalum (Ta), tantalum nitride (TaN), tungsten (W), aluminum (Al), copper (Cu) and a combination thereof. The third connecting structure 550 may be formed at the same level as the first connecting structure 350 and the second connecting structure 450.

A second filling insulation film 560 that fills the third trench 550t may be formed on the third connecting structure 550. The second filling insulation film 560 may include, e.g. at least one of silicon oxide, aluminum oxide, tantalum oxide, and a combination thereof. The second filling insulation film 560 may be formed at the same level as the first filling insulation film 460.

A second pad 555 that fills the fourth trench 555t may be formed on the third connecting structure 550. The second pad 555 may include, e.g. at least one of tungsten (W), copper (Cu), aluminum (Al), gold (Au), silver (Ag), and alloys thereof. The second pad 555 may be formed at the same level as the first pad 355.

The first protective film 155 may cover the third connecting structure 550. For example, the first protective film 155 may extend along the profile of the third connecting structure 550. The first protective film 155 may expose the second pad 555.

A light-shielding color filter 170C may be formed on the first connecting structure 350 and the second connecting structure 450. For example, the light-shielding color filter 170C may be formed to cover a part of the first protective film 155 inside the light-shielding region OB and the connecting region CR. The light-shielding color filter 170C may include, e.g. a blue color filter.

The third protective film 380 may be formed on the light-shielding color filter 170C. For example, the third protective film 380 may be formed to cover a part of the first protective film 165 inside the light-shielding region OB, the connecting region CR, and the pad region PR. The second protective film 185 may extend along the surface of the third protective film 380. The third protective film 380 may include, e.g. a light-transmitting resin. The third protective film 380 may include the same material as the microlens 180.

The second protective film 185 and the third protective film 380 may expose the second pad 555. For example, an exposure opening ER that exposes the second pad 555 may be formed inside the second protective film 185 and the third protective film 380. Therefore, the second pad 555 may be connected to an external device or the like and configured to transmit and receive electrical signals between the image sensor according to some example embodiments and the external device. That is, the second pad 555 may be an input/output pad of the image sensor.

An element separation film 115 may be formed inside the first substrate 110. For example, an element separation trench 115t may be formed inside the first substrate 110. The element separation film 115 may be formed inside the element separation trench 115t.

In FIG. 34, although the element separation film 115 is shown to be formed only around the second connecting structure 450 of the connecting region CR and around the third connecting structure 550 of the pad region PR, this is only an example, and the element separation film 115 may also be formed around the first connecting structure 350 of the light-shielding region OB.

Figure 35:
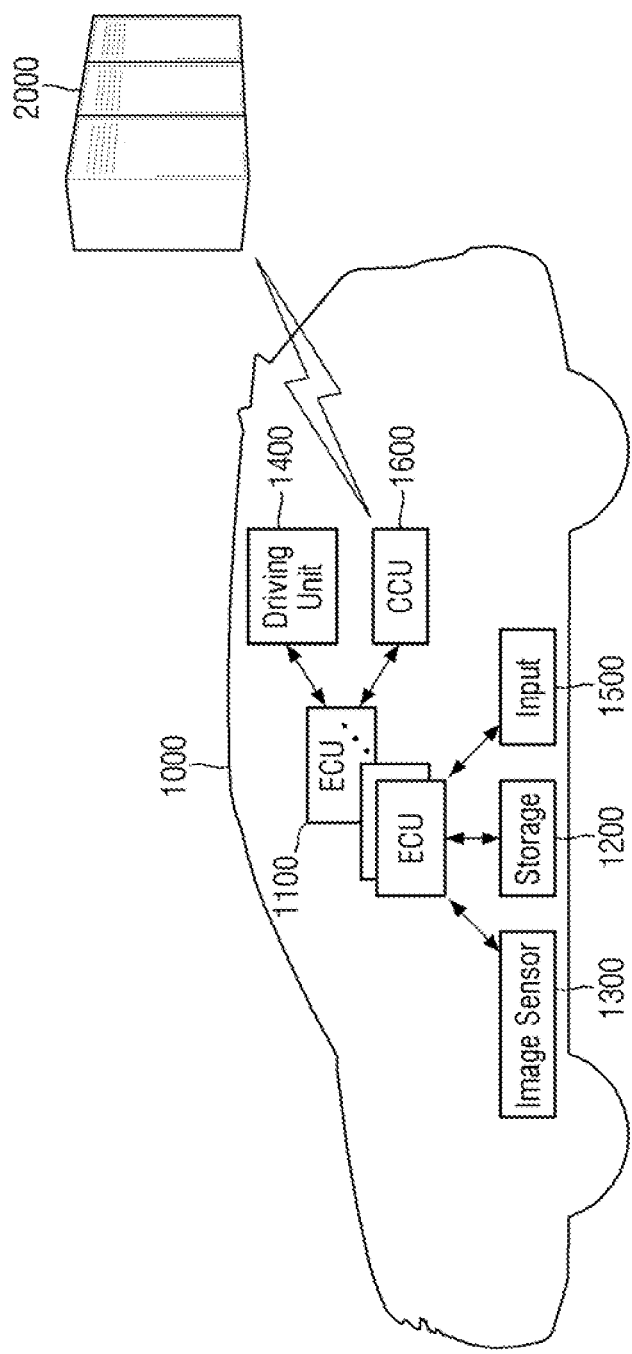
FIG. 35 is a diagram of a vehicle including an image sensor according to some example embodiments.

FIG. 35 is a diagram of a vehicle including an image sensor according to some example embodiments. For convenience of explanation, repeated parts of contents of those described using FIGS. 1 to 34 will be briefly described or omitted.

Referring to FIG. 35, a vehicle 1000 may include a plurality of electronic control units (ECU) 1100 and a storage device 1200, e.g., a memory device.

Each electronic control unit of the plurality of electronic control units 1100 may be electrically, mechanically, and communicatively connected to at least one of the plurality of devices provided in the vehicle 1000, and may control the operation of at least one device on the basis of any one function execution command.

The plurality of devices may include an image sensor 1300 that acquires information used to perform at least one function, and a driving unit 1400 that performs at least one function.

The image sensor 1300 may be the image sensor 1300 described referring to FIGS. 1 to 34. The image sensor 1300 may be implemented as an automotive image sensor.

The driving unit 1400 may include a fan and a compressor of an air conditioner, a fan of a ventilation device, an engine and a motor of a power device, a motor of a steering device, a motor and a valve of a brake device, an opening/closing device of a door or a tailgate, and the like.

The plurality of electronic control units 1100 may communicate with the image sensor 1300 and the driving unit 1400, e.g., using at least one of an Ethernet, a low voltage differential signaling (LVDS) communication, and a LIN (Local Interconnect Network) communication.

The plurality of electronic control units 1100 may determine whether there is a need to perform a function on the basis of information acquired through the image sensor 1300. When it is determined that there is a need to perform the function, the plurality of electronic control units 1100 may control the operation of the driving unit 1400 that performs the function, and may control an operation on the basis of the acquired information. The plurality of electronic control units 1100 may store the acquired information in the storage device 1200, or may read and use the information stored in the storage device 1200.

The plurality of electronic control units 1100 may control the operation of the driving unit 1400 that performs the function on the basis of a function execution command that is input through the input unit 1500, and may check a setting amount corresponding to the information that is input through the input unit 1500 and control the operation of the driving unit 1400 that performs the function on the basis of the checked setting amount.

Each electronic control unit 1100 may control any one function independently, or may control any one function in cooperation with other electronic control units. For example, when a distance to an obstacle detected through a distance detection unit is within a reference distance, an electronic control unit of a collision prevention device may output a warning sound for a collision with the obstacle through a speaker.

An electronic control unit of an autonomous driving control device may receive navigation information, road image information, and distance information to obstacles in cooperation with the electronic control unit of the vehicle terminal, the electronic control unit of the image acquisition unit, and the electronic control unit of the collision prevention device, and control the power device, the brake device, and the steering device using the received information, thereby performing the autonomous driving.

A connectivity control unit (CCU) 1600 may be electrically, mechanically, and communicatively connected to each of the plurality of electronic control units 1100, and may communicate with each of the plurality of electronic control units 1100. Thus, the connectivity control unit 1600 may directly communicate with a plurality of electronic control units 1100 provided inside the vehicle, may communicate with an external server, and may communicate with an external terminal through an interface.

The connectivity control unit 1600 may communicate with the plurality of electronic control units 1100, and may communicate with the server 2000, using an antenna (not shown) and a RF communication.

The connectivity control unit 1600 may communicate with the server 2000 by wireless communication. The wireless communication between the connectivity control unit 1600 and the server 2000 may be performed through various wireless communication methods such as a GSM (global System for Mobile Communication), a CDMA (Code Division Multiple Access), a WCDMA (Wideband Code Division Multiple Access), a UMTS (universal mobile telecommunications system), a TDMA (Time Division Multiple Access), and an LTE (Long Term Evolution), in addition to a Wi-Fi module and a Wireless broadband module.

As described above, example embodiments may provide an image sensor having improved product reliability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor, comprising:
  a pixel group including a first region and a second region; and
  a color filter having a first color on the pixel group, wherein:
  the first region includes a first pixel including a first photodiode, a first floating diffusion region on the first photodiode, and a first transfer transistor on the first photodiode,
  the second region includes a second pixel including a second photodiode, a second floating diffusion region, and a second transfer transistor connected to the second photodiode and the second floating diffusion region,
  each of the first pixel and the second pixel are arranged in an m*n arrangement, wherein m and n are natural numbers of 2 or more, such that at least four first pixels are in the first region and at least four second pixels are in the second region, and at least four first photodiodes are in the first region and at least four second photodiodes are in the second region,
  in plane view, a total first photodiode area in the first region is greater than a total second photodiode area in the second region, and
  in plane view, the first region surrounds the second region.

2. The image sensor as claimed in claim 1, wherein the first pixel further includes a connecting transistor connecting the first floating diffusion region and the second floating diffusion region.

3. The image sensor as claimed in claim 1, wherein the second region has a rhombic shape in plane view.

4. The image sensor as claimed in claim 1, wherein, in plane view, the first region has a cross shape and the second region has a rectangular shape.

5. The image sensor as claimed in claim 1, wherein, in plane view, a total area of the first region is greater than a total area of the second region.

6. The image sensor as claimed in claim 1, wherein, in plane view, the first photodiode in the first pixel has an area that is the same as that of the second photodiode in the second pixel.

7. The image sensor as claimed in claim 6, wherein:
  the first pixel and the second pixel are each arranged in the m*n arrangement, and
  the first pixel includes a plurality of first sub-pixels, each of the plurality of first sub-pixels including the first photodiode, the first floating diffusion region, and the first transfer transistor.

8. The image sensor as claimed in claim 7, wherein the second pixel includes a plurality of second sub-pixels, each of the plurality of second sub-pixels including the second photodiode, the second floating diffusion region, and the second transfer transistor.

9. The image sensor as claimed in claim 1, further comprising:
  a first microlens corresponding to the first pixel; and
  a second microlens corresponding to the second pixel.

10. The image sensor as claimed in claim 1, wherein:
  the first pixel is arranged in the m*n arrangement, the first pixel includes a plurality of sub-pixels, each of the plurality of sub-pixels including the first photodiode, the first floating diffusion region, and the first transfer transistor, and the image sensor further comprises:

a first microlens corresponding to each of the plurality of sub-pixels; and a second microlens corresponding to the second pixel.

11. The image sensor as claimed in claim 1, further comprising a substrate, wherein:

the first photodiode and the second photodiode are disposed in the substrate, and at least a part of a gate of the first transfer transistor and at least a part of a gate of the second transfer transistor are disposed inside the substrate.

12. The image sensor as claimed in claim 1, further comprising:

a substrate, the first photodiode and the second photodiode being disposed in the substrate; and a pixel separation pattern defining the first pixel and the second pixel inside the substrate.

13. The image sensor as claimed in claim 12, wherein:

the substrate has a first side, and a second side opposite to the first side, the color filter is disposed on the second side of the substrate, and the pixel separation pattern extends from the first side of the substrate to the second side of the substrate.

14. The image sensor as claimed in claim 12, wherein:

the substrate has a first side, and a second side opposite to the first side, the color filter is disposed on the second side of the substrate, and the pixel separation pattern extends from the second side of the substrate and penetrates a part of the substrate.

15. An image sensor, comprising:

a pixel group including a first region and a second region; and a color filter having a first color on the pixel group, wherein:

the first region includes a single first pixel including a first photodiode, a first floating diffusion region on the first photodiode, and a first transfer transistor on the first photodiode, the second region includes a second pixel including a second photodiode, a second floating diffusion region, and a second transfer transistor connected to the second photodiode and the second floating diffusion region, the second pixel is arranged in an m*n arrangement, wherein m and n are natural numbers of 2 or more, such that at least four second pixels are in the second region, and at least four second photodiodes are in the second region, in plane view, a total first photodiode area in the first region is greater than a total second photodiode area in the second region, and a single first pixel is present in the pixel group.

16. A vehicle, comprising:

an electronic control unit; and an image sensor connected to the electronic control unit, the image sensor including:

a pixel array including a plurality of pixel groups having a first region and second region;

color filters respectively corresponding to each of the plurality of pixel groups on the pixel array; and a readout circuit that connects the pixel array and the electronic control unit, wherein:

the first region includes a first pixel including a first photodiode, a first floating diffusion region on the first photodiode, and a first transfer transistor on the first photodiode, the second region includes a second pixel including a second photodiode, a second floating diffusion region on the second photodiode, and a second transfer transistor on the second photodiode, each of the first pixel and the second pixel are arranged in an m*n arrangement in each pixel group, wherein m and n are natural numbers of 2 or more, such that at least four first pixels are in each pixel group and at least four second pixels are in each pixel group, and at least four first photodiodes are in each pixel group and at least four second photodiodes are in each pixel group, in plane view, a total first photodiode area is greater than a total second photodiode area in each pixel group, and in plane view, the first region surrounds the second region.

17. The vehicle as claimed in claim 16, wherein the first pixel further includes a connecting transistor connecting the first floating diffusion region and the second floating diffusion region.

18. The vehicle as claimed in claim 16, wherein the second region has a rhombic shape in plane view.

19. The vehicle as claimed in claim 16, wherein the image sensor further includes:

a first microlens corresponding to the first pixel; and a second microlens corresponding to the second pixel.

* * * * *